US012752712B2

(12) United States Patent
Miwa et al.

(10) Patent No.: US 12,752,712 B2
(45) Date of Patent: Oct. 6, 2026

(54) VEHICLE STEP DEVICE

(71) Applicant: AISIN CORPORATION, Kariya (JP)

(72) Inventors: Masashi Miwa, Fujisawa (JP); Takanori Yasutake, Fujisawa (JP)

(73) Assignee: AISIN CORPORATION, Kariya (JP)

( * ) Notice: Subject to any disclaimer, the term of this patent is extended or adjusted under 35 U.S.C. 154(b) by 271 days.

(21) Appl. No.: 18/693,009

(22) PCT Filed: Oct. 28, 2022

(86) PCT No.: PCT/JP2022/040294
§ 371 (c)(1),
(2) Date: Mar. 18, 2024

(87) PCT Pub. No.: WO2023/074833
PCT Pub. Date: May 4, 2023

(65) Prior Publication Data

US 2024/0375591 A1 Nov. 14, 2024

(30) Foreign Application Priority Data

Oct. 29, 2021 (JP) ................................ 2021-177560
Jun. 23, 2022 (JP) ................................ 2022-101115

(51) Int. Cl.
*B60R 3/02* (2006.01)

(52) U.S. Cl.
CPC .................................... *B60R 3/02* (2013.01)

(58) Field of Classification Search
CPC .................................. B60R 3/00; B60R 3/02
See application file for complete search history.

(56) References Cited

U.S. PATENT DOCUMENTS 8,146,935 B1 * 4/2012 Adams .................. B60R 13/043 293/118
8,505,944 B2 * 8/2013 Genest ...................... B60R 3/02 280/166
9,522,634 B1 * 12/2016 Smith ........................ B60R 3/02
10,183,624 B2 * 1/2019 Leitner ...................... B60R 3/02
10,493,920 B2 * 12/2019 Leitner ...................... B60R 3/02
11,623,573 B2 * 4/2023 Adams ....................... B60R 3/02 280/166
2012/0279041 A1 * 11/2012 Pochurek .................. B60R 3/02 29/525.01

(Continued)

FOREIGN PATENT DOCUMENTS

JP 2006315449 A * 11/2006
JP 2014237364 A * 12/2014

(Continued)

OTHER PUBLICATIONS

International Search Report issued Jan. 10, 2023 in PCT/JP2022/040294, filed on Oct. 28, 2022, 2 pages.

*Primary Examiner* — Jason C Smith
(74) *Attorney, Agent, or Firm* — Oblon, McClelland, Maier & Neustadt, L.L.P.

(57) ABSTRACT

A vehicle step device includes: a base attached to a vehicle body; an arm attached to the base; a step assembled with the arm; and a protection member that is arranged on a width-direction inner side of a position of the step in a retracted state and is provided in such a way as to face at least a part of the base, the arm, and the step.

4 Claims, 12 Drawing Sheets

(56) References Cited

U.S. PATENT DOCUMENTS

| | | | | |
|---|---|---|---|---|
| 2013/0154230 | A1 * | 6/2013 | Ziaylek | B60R 3/02 280/166 |
| 2020/0189473 | A1 * | 6/2020 | Norris | B60R 3/02 |
| 2021/0031696 | A1 * | 2/2021 | Kaddouh | B62D 33/02 |
| 2024/0375591 | A1 * | 11/2024 | Miwa | B60R 3/00 |
| 2024/0383407 | A1 * | 11/2024 | Miwa | B60R 3/00 |
| 2025/0074314 | A1 * | 3/2025 | Barr, III | B60R 19/48 |

FOREIGN PATENT DOCUMENTS

| | | | | | |
|---|---|---|---|---|---|
| JP | 2020-83052 | A | | 6/2020 | |
| JP | 2022-77636 | A | | 5/2022 | |
| JP | 2022077638 | A | * | 5/2022 | B60R 3/02 |
| JP | 2023066770 | A | * | 5/2023 | |
| JP | 7415883 | B2 | * | 1/2024 | B60R 3/02 |
| JP | 2024002877 | A | * | 1/2024 | |
| KR | 20260010288 | A | * | 1/2026 | G01M 99/001 |
| WO | WO-2023074831 | A1 | * | 5/2023 | B60R 3/00 |

* cited by examiner

FIG.17
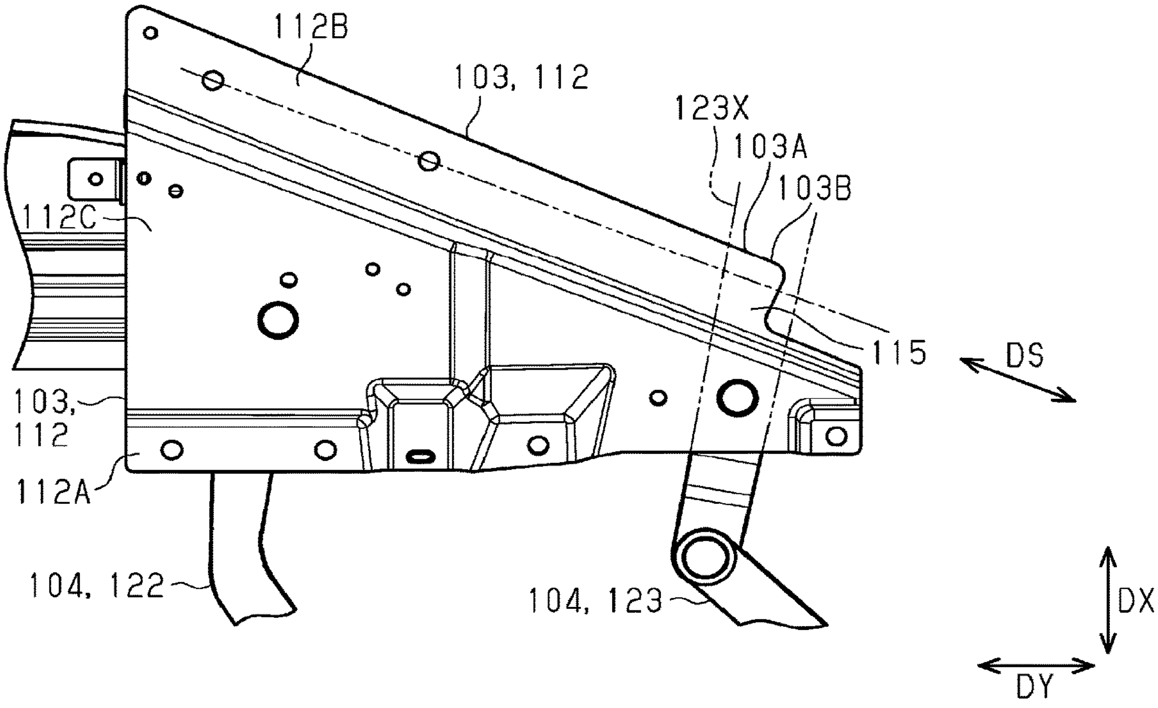
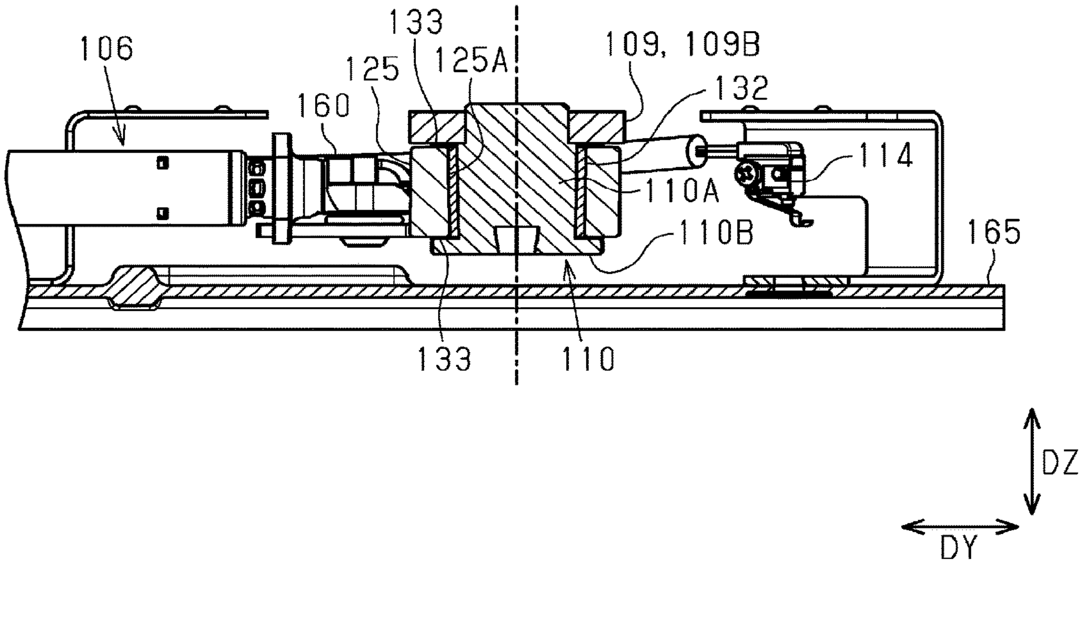

VEHICLE STEP DEVICE

TECHNICAL FIELD

The present disclosure relates to a vehicle step device.

BACKGROUND ART

Patent Literature 1 discloses a vehicle step device. The vehicle step device includes a step and a drive unit. In a vehicle width direction, an outer side of the drive unit is coupled to a lower portion of a side sill. In the vehicle width direction, an upper portion of the drive unit is attached to a floor member via a bracket.

Patent Literature 2 discloses a vehicle step device having another structure.

The vehicle step device includes a four-joint link mechanism. The four-joint link mechanism is attached to a bracket provided in such a way as to straddle a flange protruding downward from a vehicle body. Each of both-side parts that are included in the bracket and straddle the flange is fixed to the vehicle body with a bolt.

CITATION LIST

Patent Literature

Patent Literature 1: JP2014-237364A
Patent Literature 2: JP2020-83052A

BRIEF SUMMARY

Technical Problem

Two independent main problems are present in this disclosure.

A first problem is as follows. According to the technique disclosed in Patent Literature 1, when a vehicle receives a collision load from the side, the drive unit rotates in such a way as to be pulled upward. This rotation causes the drive unit to move inward in the width direction while a lower portion on a width-direction inner side in the drive unit moves downward. However, when the vehicle receives a collision load from the side, a direction of force applied to the drive unit of the vehicle step device differs depending on a situation. There is room for improvement in a technique of protecting a part located on an inner side of the vehicle step device in a collision on the vehicle side.

A second problem is as follows. The vehicle step device is attached to the vehicle body. There is room for improvement concerning the number of process steps of attaching the vehicle step device to the vehicle body.

Solution to Problem

The following describes a means for solving the above-described first problem.

A vehicle step device according to a first aspect of the present disclosure includes: a base attached to a vehicle body; an arm attached to the base; a step assembled with the arm; and a protection member that is arranged on a width-direction inner side of a position of the step in a retracted state and is provided in such a way as to face at least a part of the base, the arm, and the step.

According to this configuration, the protection member is provided in such a way as to face at least a part of the base, the arm, and the step, and thus, the base, the arm, or the step can be restricted from moving to a width-direction inner side beyond the protection member when a collision load received by a vehicle causes the base, the arm, or the step to move to the vehicle width-direction inner side. Thereby, a device located on a width-direction inner side of the vehicle step device can be protected.

The following describes a means for solving the above-described second problem.

A vehicle step device according to a second aspect of the present disclosure is a vehicle step device provided at a vehicle body and includes: a base attached to the vehicle body; an arm attached to the base; and a step attached to the arm. The arm includes a base portion and an arm portion extending from the base portion. The base includes a fastened portion being fastened to the vehicle body, a contact portion coming into contact against a lower surface of the vehicle body, and a shaft support portion supporting a shaft member of the arm. The contact portion is located at the shaft support portion, or is located closer to a center of the vehicle body than the shaft support portion.

The following describes another means for solving the above-described second problem.

A vehicle step device according to a third aspect of the present disclosure is a vehicle step device provided at a vehicle body and includes: an arm attached to a vehicle body structure including the vehicle body; and a step attached to the arm. The arm includes a base portion including a penetration hole, and an arm portion extending from the base portion, and is rotatably attached to the vehicle body structure by a support member and a shaft member. The support member is provided directly or indirectly at the vehicle body. The shaft member includes a shaft body portion being attached to the support member through the penetration hole of the arm, and a head portion provided at an end of the shaft body portion. The head portion and the support member sandwich and hold the base portion of the arm. According to this configuration, the arm can be easily attached to the support member.

Advantageous Effects

In a first standpoint, according to the vehicle step device, a device located on a width-direction inner side of the vehicle step device can be protected. In a second standpoint, according to the vehicle step device, the number of process steps of attaching to the vehicle body can be reduced.

BRIEF DESCRIPTION OF DRAWINGS

FIG. 17 is a plan view of a second base.

FIG. 18 is a sectional view of the vehicle step device taken along the 18-18 line in FIG. 13.

DESCRIPTION OF EMBODIMENTS

First Embodiment

In a first embodiment, a technique concerning the first problem is disclosed.

A vehicle step device 10 according to the first embodiment will be described with reference to FIG. 1 to FIG. 6.

The vehicle step device 10 is attached directly or indirectly to a vehicle body 1. In an example of the indirect attachment, the vehicle step device 10 is attached to the vehicle body 1 via a reinforcement member that reinforces the vehicle body 1. In the following description, a state in which the vehicle step device 10 is directly or indirectly attached to the vehicle body 1 is referred to as "an attached state of the vehicle step device 10".

A front-rear direction DY of the vehicle step device 10 matches a front-rear direction of the vehicle body 1, in the attached state of the vehicle step device 10. A width direction DX of the vehicle step device 10 matches a width direction of the vehicle body 1, in the attached state of the vehicle step device 10. A width-direction inner side DXA indicates a direction directed to the vehicle center axis, in the attached state of the vehicle step device 10. An up-down direction DZ of the vehicle step device 10 matches an up-down direction of the vehicle body 1, in the attached state of the vehicle step device 10.

<Vehicle Step Device>

The vehicle step device 10 is attached near a vehicle entrance that is closed by a door in the vehicle. A step 13 of the vehicle step device 10 is used as an auxiliary step for getting on and off the vehicle. Thus, the step 13 is arranged on a lower side of an lower end of the vehicle entrance. In one example, the step 13 is moved by power of a motor. The step 13 is moved from a retracted position of being accommodated under a bottom plate of the vehicle body 1 to a deployed position, in response to a predetermined operation command at the time of getting on and off. The deployed position (refer to FIG. 1) is located separate, relative to the vehicle body 1, outward in the width direction DX from the retracted position (refer to FIG. 2). When the step 13 is moved as far as the deployed position, at least a part of the step 13 is exposed from the vehicle body 1 in a plan view.

Figure 1:
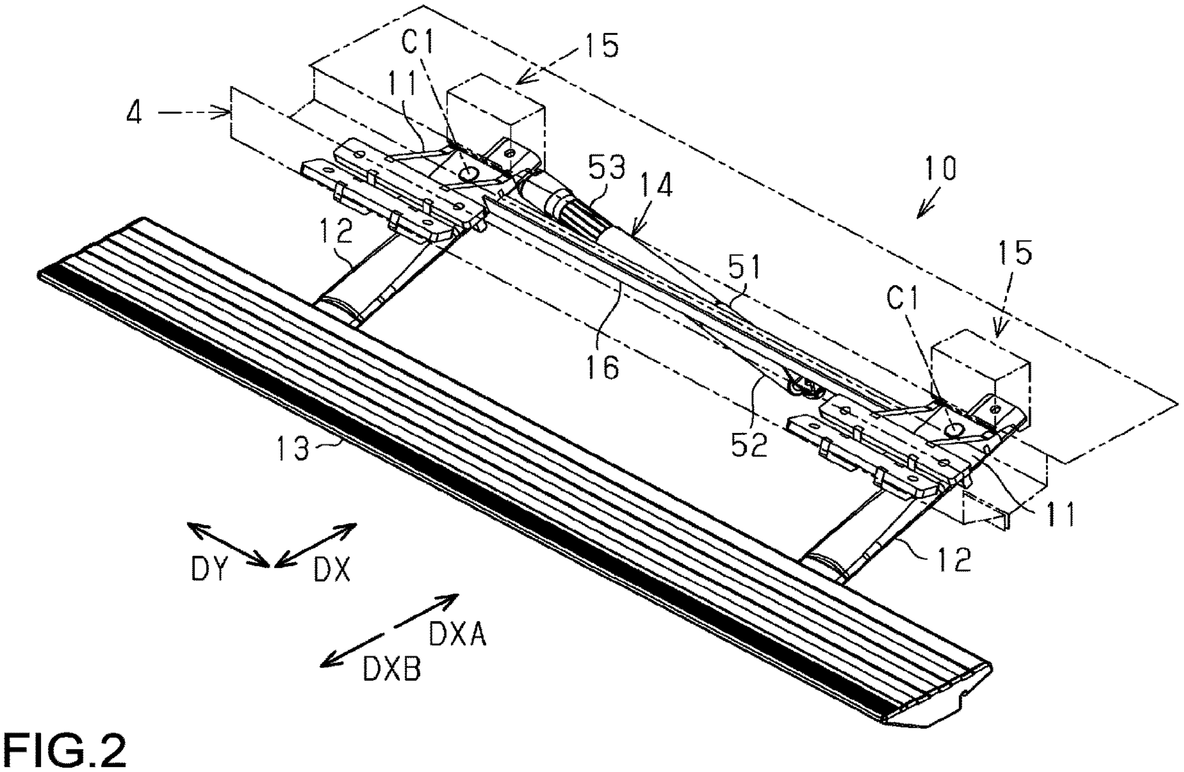
FIG. 1 is a perspective view of a vehicle step device in a deployed state in a first embodiment.
Figure 2:
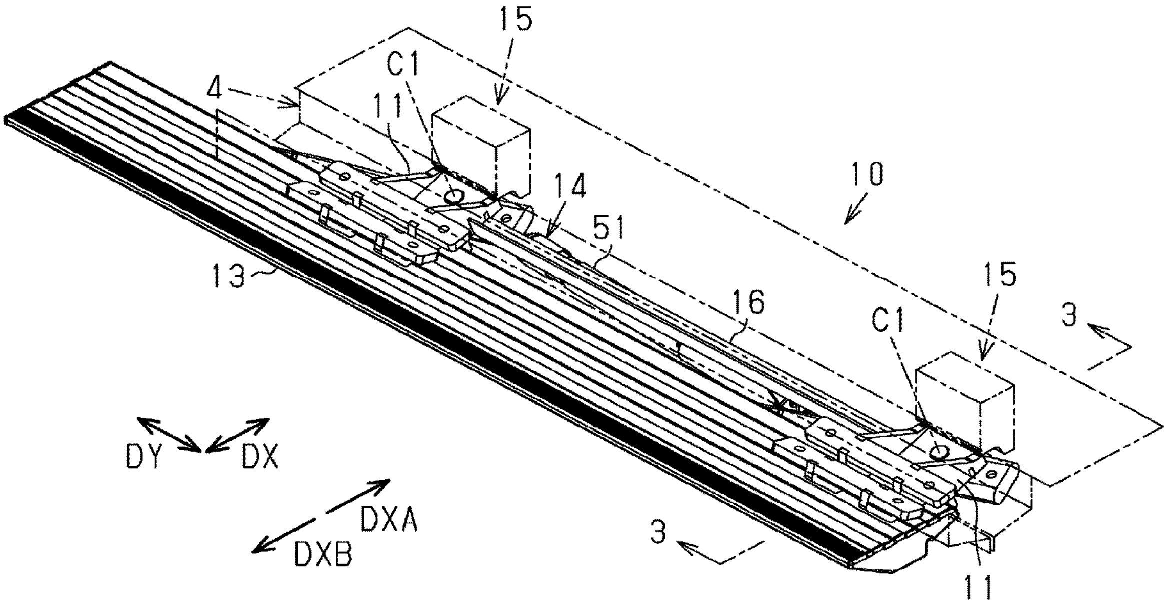
FIG. 2 is a perspective view of the vehicle step device in a retracted state in the first embodiment.
Figure 5:
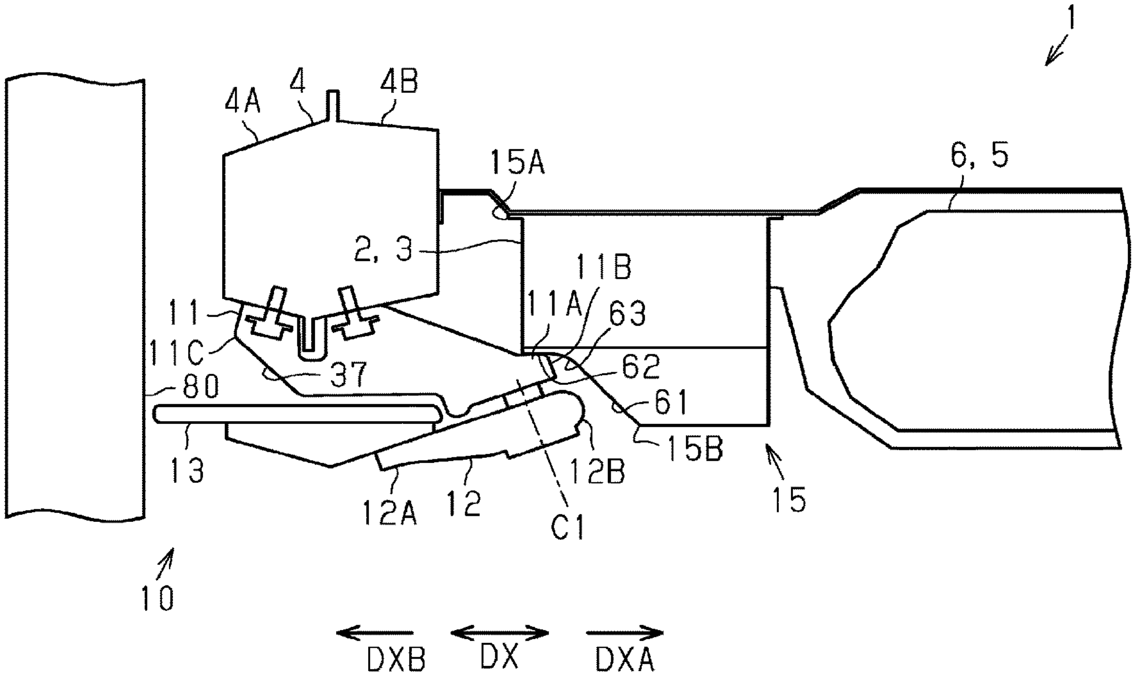
FIG. 5 is a sectional view of the vehicle step device and a vehicle body.

As illustrated in FIG. 1 and FIG. 2, the vehicle step device 10 includes a base 11 attached to the vehicle body 1, an arm 12 attached to the base 11, the step 13 assembled with the arm 12, and a protection member 15 (refer to FIG. 5). The vehicle step device 10 may include the drive unit 14. The vehicle step device 10 may include a plurality of the arms 12. In the present embodiment, the vehicle step device 10 includes the two arms 12.

<Base>

The base 11 supports the arm 12. In the present embodiment, the vehicle step device 10 includes the two bases 11. The two bases 11 are attached to a rocker 4 of the vehicle body 1 while being at an interval from each other in the front-rear direction DY. The two bases 11 are coupled to each other by a coupling bar 16. The coupling bar 16 is made of iron-based steel or aluminum steel.

Figure 4:
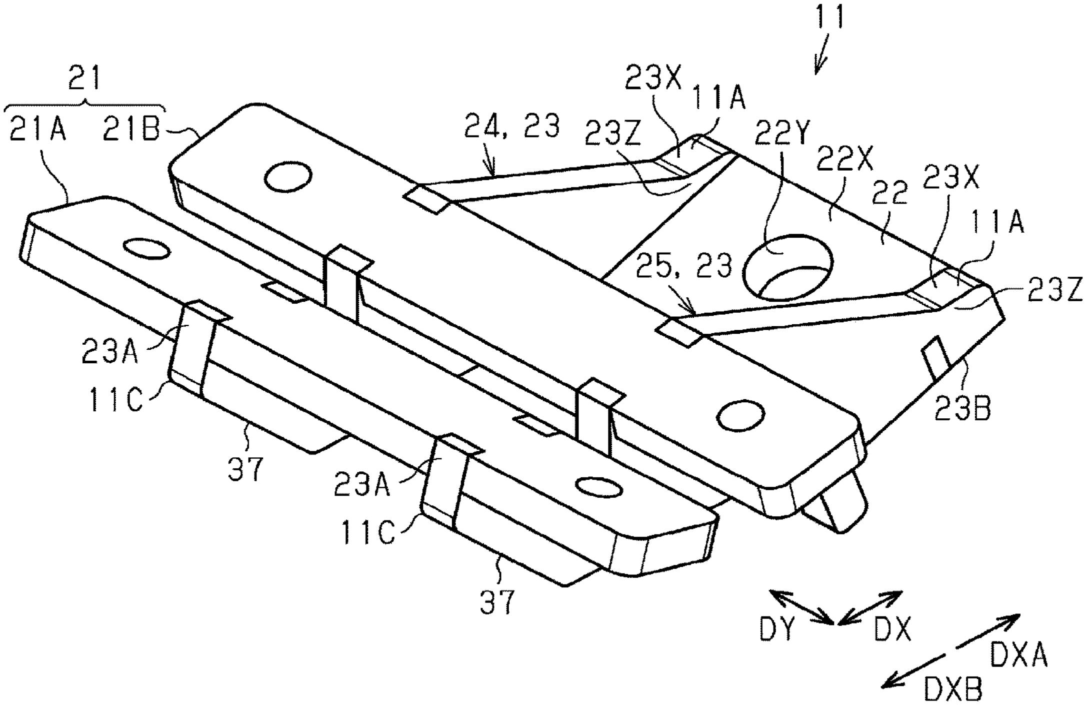
FIG. 4 is a perspective view of a base.

As illustrated in FIG. 4, the base 11 includes a fixed portion 21 fixed to the rocker 4 of the vehicle body 1, an arm support portion 22 supporting the arm 12, and a coupling portion 23 coupling the fixed portion 21 and the arm support part 23 to each other. The fixed portion 21 is fastened to the rocker 4 with a bolt. In the present embodiment, the fixed portion 21 includes a first fixed portion 21A fixed to an outer member 4A of the rocker 4, and a second fixed portion 21B fixed to an inner member 4B of the rocker 4.

The coupling portion 23 is formed in such a way as to extend inward in the width direction DXA in a state where the base 11 is fixed to the rocker 4 (refer to FIG. 5). The fixed portion 21 is attached to an outer-end upper portion 23A of the coupling portion 23. The arm support portion 22 is attached to a lower end portion 23B that is a part included in the coupling portion 23 and located on an inner side of the outer-end upper portion 23A. The coupling portion 23 includes a first coupling portion 24 and a second coupling portion 25.

The base 11 includes an outer end portion 11C. The outer end portion 11C includes a part located on the outermost side in the width direction DX. The base 11 includes an outer inclination surface 37. The outer inclination surface 37 is inclined from the outer end portion 11C to a lower side, toward the width-direction inner side DXA.

In one example, the outer end portion 11C is provided at the first coupling portion 24. The outer end portion 11C is located near an upper surface of the base 11 in the up-down direction DZ. Specifically, the outer end portion 11C is located on an upper side of an intermediate position between an upper surface of the first coupling portion 24 and a lower surface of the first coupling portion 24 in the up-down direction DZ. In another example, the outer end portion 11C is located on an upper side of the gravity center of the first coupling portion 24. Further, in another example, the outer end portion 11C is located on an upper side of an inner end 11A in the up-down direction DZ.

The outer end portion 11C is formed as a corner or a projection. The corner is formed in such a way that an apex of the corner is located on the outermost side in the base 11 in the width direction DX. The projection is formed in such a way as to protrude outward in the width direction DXB. When the outer end portion 11C is constituted by the corner, the outer inclination surface 37 is inclined to a lower side from the apex of the corner, toward the width-direction inner side DXA. When the outer end portion 11C is constituted by the projection, the outer inclination surface 37 is inclined to a lower side from a root of the projection, toward the width-direction inner side DXA.

The second coupling portion 25 has the same structure as that of the first coupling portion 24. The second coupling portion 25 is arranged at an interval from the first coupling portion 24 on a rear side of the first coupling portion 24. The fixed portion 21 is supported by the first coupling portion 24 and the second coupling portion 25.

The arm support portion 22 is formed in such a way as to be connected to the first coupling portion 24 and the second coupling portion 25. The arm support portion 22 is arranged between the first coupling portion 24 and the second coupling portion 25. The arm support portion 22 is constituted by a plate-shaped member. The arm support portion 22 includes a shaft support portion 22X that receives a first shaft 31. The shaft support portion 22X includes a penetration hole 22Y that receives the first shaft 31 of the arm 12. The shaft support portion 22X is arranged closer to the center of the vehicle body than the fixed portion 21 is.

<Arm>

The arm 12 supports the step 13. The step 13 is attached to a distal end portion 12A of the arm 12. The front-side arm 12 out of the two arms 12 supports a front portion of the step 13. The rear-side arm 12 supports a rear portion of the step 13.

Figure 3:
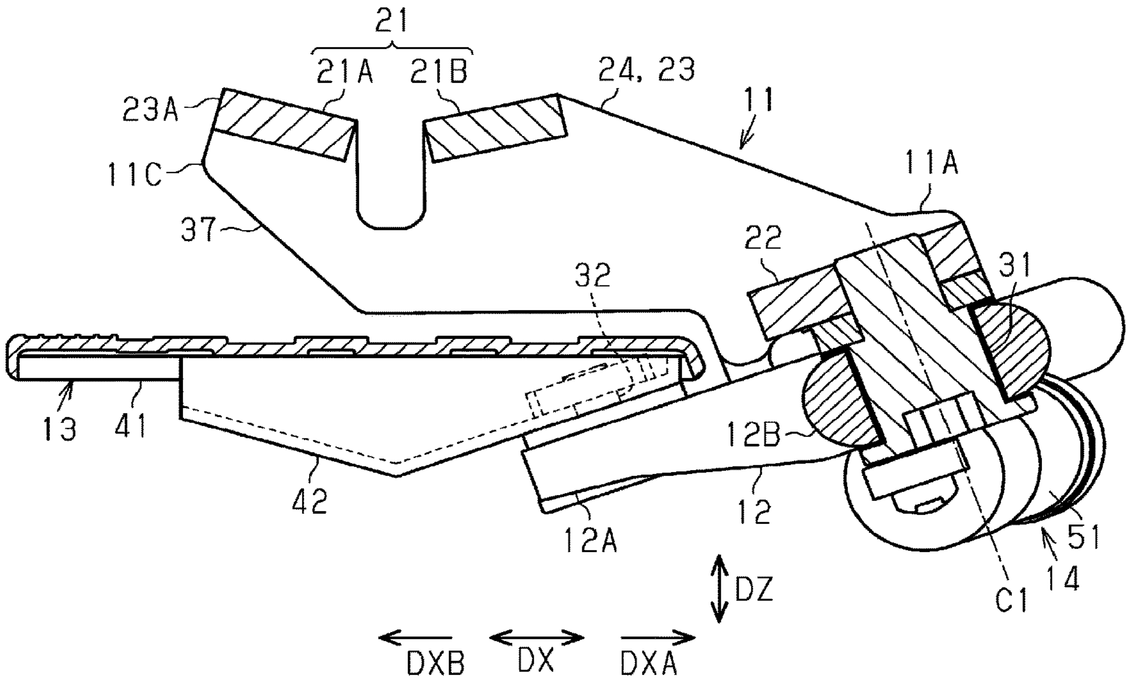
FIG. 3 is a sectional view of the vehicle step device taken along the 3-3 line in FIG. 2.

As illustrated in FIG. 3, a base portion 12B of the arm 12 is rotatably attached to the base 11. The base portion 12B of the arm 12 is attached to the arm support portion 22 via the first shaft 31. In the attached state of the vehicle step device 10, the central axis C1 of the first shaft 31 is inclined to a lower side toward the width-direction inner side DXA. The arm 12 rotates around the central axis C1 of the first shaft 31. In rotation of the arm 12, the distal end portion 12A of the arm 12 moves from a first position when the step 13 is located at the deployed position to a second position when the step 13 is located at the retracted position. The second position is located on a front side of and on the width-direction inner side DXA of the first position.

<Step>

The step 13 is supported by the two arms 12. The step 13 moves between the deployed position and the retracted position by rotation of the arm 12. At the retracted position, all or a part of the step 13 is arranged under the vehicle body 1. At the deployed position, all or a part of the step 13 is exposed from the vehicle body 1. In a plan view of the step 13, an area of the part exposed from the vehicle body 1 at the deployed position is larger than an area of a part exposed from the vehicle body 1 at the retracted position.

As illustrated in FIG. 3, the step 13 includes a step body portion 41, and an arm attachment portion 42 to which the arm 12 is attached. The step body portion 41 is formed in such a way that an upper surface of the step body portion 41 is horizontal in the attached state of the vehicle step device 10. The arm attachment portion 42 is provided on a lower surface of the step body portion 41. The distal end portion 12A of the arm 12 is joined to the arm attachment portion 42. The distal end portion 12A of the arm 12 is rotatably attached to the arm attachment portion 42. The distal end portion 12A of the arm 12 is attached to the arm attachment portion 42 via a second shaft 32. In one example, the arm attachment portion 42 is formed as a bracket.

<Drive Unit>

The drive unit 14 moves the step 13 relative to the base 11. In one example, the drive unit 14 moves the step 13 by rotating the arm 12. For example, the drive unit 14 includes an expansion-contraction unit 51. The expansion-contraction unit 51 includes a body portion 52 and a movement portion 53 that moves relative to the body portion 52. The body portion 52 is connected directly or indirectly to the vehicle body 1. For example, a rear end portion of the body portion 52 is connected to the coupling bar 16 via a universal joint. The movement portion 53 is connected to the arm 12. For example, a front end portion of the movement portion 53 is connected to an inner end portion of the arm 12 via a universal joint.

The body portion 52 includes the motor and a spindle rotated by the motor. The movement portion 53 includes a nut that engages with the spindle. Rotation of the spindle causes the movement portion 53 to move along an axial direction of the spindle together with the nut. In this manner, the expansion-contraction unit 51 expands and contracts. Expansion and contraction of the expansion-contraction unit 51 causes the arm 12 to rotate, and accompanying the rotation of the arm 12, the step 13 is moved.

<Protection Member>

The protection member 15 is provided in order to restrict the vehicle step device 10 from moving to the width-direction inner side DXA.

In one example, a fuel tank 6 or a device 5 such as a fuel cell is provided under the vehicle body 1. There is a case where the vehicle step device 10 is arranged next to the fuel tank 6 or the fuel cell in the width direction DX.

In some cases, in a side view of the vehicle, the vehicle step device 10 partially overlaps with the fuel tank 6 or the fuel cell.

When the vehicle collides with an object 80 or when the object 80 collides with the vehicle, the vehicle step device 10 moves due to the collision. When the object 80 collides with a side surface of the vehicle, there is a possibility that the vehicle step device 10 is displaced to the width-direction inner side DXA, and the vehicle step device 10 comes into contact with the fuel tank 6 or the fuel cell. In order to prevent or suppress such contact, the protection member 15 is provided in the vehicle body 1. Examples of the object 80 include a utility pole, a wall, a constructed object, a guardrail, a cliff, an automobile, a motorcycle, and the like.

As illustrated in FIG. 5, the protection member 15 is arranged on the width-direction inner side DXA of a position of the step 13 in a retracted state. The protection member 15 is provided in such a way as to face at least a part of the base 11, the arm 12, and the step 13. The protection member 15 may be arranged in such a way as to partially overlap with the base 11 in a side view of the vehicle. The protection member 15 may be arranged in such a way as to partially overlap with the arm 12 in a side view of the vehicle. The protection member 15 may be arranged in such a way as to partially overlap with the step 13 in a side view of the vehicle. In one example, the protection member 15 is arranged between the step 13 and the fuel tank 6 or the fuel cell.

Alternatively, the protection member 15 may be arranged on the width-direction inner side DXA of a position of the base 11. The protection member 15 is provided in such a way as to face the base 11. In one example, the protection member 15 is arranged in such a way as to overlap with the entire base 11 in a side of the vehicle. In one example, the protection member 15 is arranged between the base 11 and the fuel tank 6 or the fuel cell.

The protection member 15 is fixed to a frame member 2 of the vehicle body 1. For example, the protection member 15 is fixed to the frame member 2 by a bolt or a rivet. The frame member 2 is a side member 3, for example. Thus, the protection member 15 is attached to the high-rigidity part in the vehicle body 1.

An upper end 15A of the protection member 15 is formed in such a way as to be located on an upper side of the base 11 in a state where the protection member 15 is attached to the vehicle body 1. A lower end 15B of the protection member 15 is formed in such a way as to be located on a lower side of an upper surface of the step 13 in a retracted state (refer to FIG. 5), in the state where the protection member 15 is attached to the vehicle body 1.

The protection member 15 includes an inclination portion 61. The inclination portion 61 is inclined to a lower side toward the width-direction inner side DXA in a state where the protection member 15 is fixed to the vehicle body 1. The protection member 15 includes a flat portion 62. The flat portion 62 is located on an outer side of the inclination portion 61 in the width direction DX. The flat portion 62 extends to the width-direction inner side DXA, and is connected to the inclination portion 61. The flat portion 62 extends horizontally in the state where the protection member 15 is fixed to the vehicle body 1. A lower surface of the flat portion 62 is formed horizontally. A boundary 63 between the flat portion 62 and the inclination portion 61 of the protection member 15 is located on the width-direction inner side DXA of an inner end 11B of the base 11 that contacts the flat portion 62 (refer FIG. 5).

The protection member 15 is formed in such a way as to contact with the base 11. Specifically, the flat portion 62 of the protection member 15 contacts with an upper surface of the inner end portion 11A of the base 11. In the present embodiment, the inner end portion 11A of the base 11 is a part (refer to FIG. 3) including an upper surface in the inner end 11B of the coupling portion 23 (the first coupling portion 24 and the second coupling portion 25) of the base 11. In one example, the upper surface in the inner end 11B of the coupling portion 23 of the base 11 is formed in such a way as to be horizontal in the state where the base 11 is fixed to the frame member 2.

For example, the protection member 15 is made by pressing an iron plate. The protection member 15 may be made also by processing an iron pipe. The protection member 15 may be formed in such a way as to overlap with the entire vehicle step device 10 in the retracted state, in a side view. The protection member 15 may be provided only between the fuel tank 6 or the fuel cell and the vehicle step device 10.

<Effects>

Effects of the present embodiment will be described.

Figure 6:
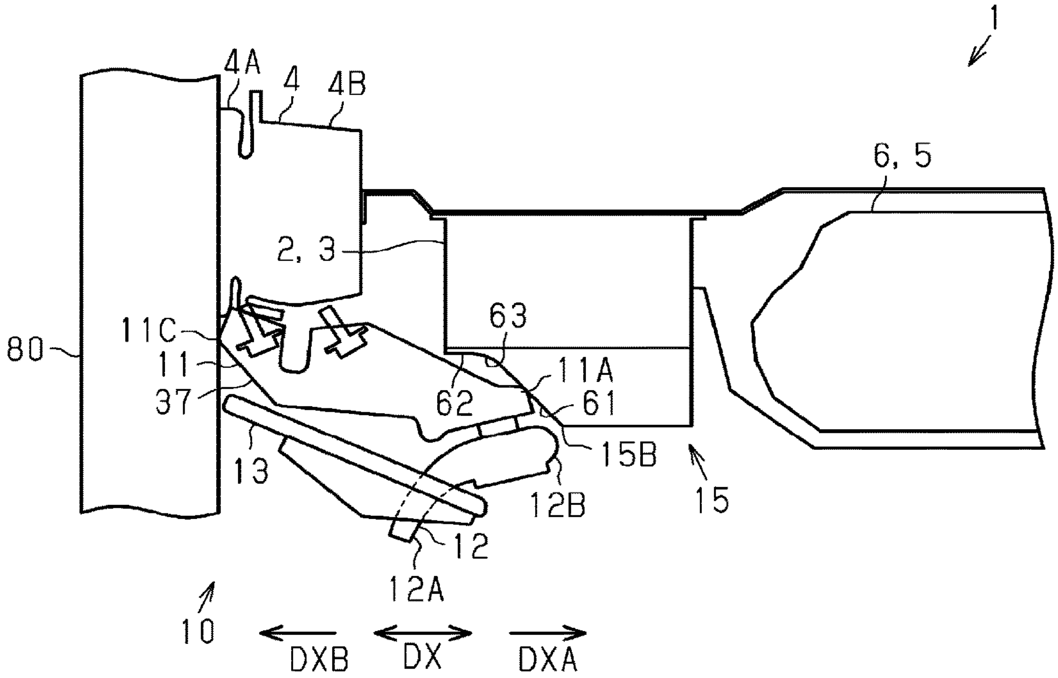
FIG. 6 is a sectional view of the vehicle step device and the vehicle body at the time of a collision.

As illustrated in FIG. 6, when the object 80 collides with the step 13 in a vehicle collision, the step 13 moves to the width-direction inner side DXA. Even when the object 80 collides with a front portion of the vehicle, there is a case where the step 13 and the base 11 move to the width-direction inner side DXA due to deformation of the vehicle body 1. In such a case, there is a possibility that the movement of the step 13 or the base 11 causes damage to the device 5 arranged on the width-direction inner side DXA of the step 13 and the base 11.

In the present embodiment, the base 11 is provided with the outer end portion 11C. Thereby, the following effect is achieved. At the time of a collision of the vehicle, the object 80 hits the step 13, and then comes into contact with the outer end portion 11C of the base 11. Since the outer end portion 11C is formed as the corner or the projection, the base 11 rotates around the outer end portion 11C when the object 80 comes into contact with the outer end portion 11C of the base 11. Since the base 11 is provided with the outer inclination surface 37, the base 11 rotates in such a way that the inner end portion 11A of the base 11 moves downward. Further, since the base 11 includes the outer end portion 11C arranged near the upper surface, the inner end portion 11A of the base 11 easily rotates in such a way as to move downward. In such a manner, at the time of a vehicle collision, the vehicle step device 10 moves to the width-direction inner side DXA while rotating in such a way that the inner end portion 11A of the base 11 moves downward. Thereby, the vehicle step device 10 is suppressed from horizontally moving to the width-direction inner side DXA.

In the present embodiment, the protection member 15 is arranged on the width-direction inner side DXA of the position of the step 13 in the retracted state. The protection member 15 is provided in such a way as to face the step 13. The protection member 15 is arranged on the width-direction inner side DXA of the position of the base 11. The protection member 15 is provided in such a way as to face the base 11. Thus, when the step 13 or the base 11 moves to the width-direction inner side DXA, the protection member 15 restricts the movement. Thereby, the device 5 located on the width-direction inner side DXA of the vehicle step device 10 can be protected.

The base 11 is fixed to the rocker 4. In contrast to this, the protection member 15 is fixed to the frame member 2. Thus, a force at the time of a collision is transmitted to the step 13, the arm 12, the base 11, and the rocker 4 in this order, and deforms these members. Thereby, the force at the time of the collision is absorbed by the vehicle step device 10 and the vehicle body 1. As a result, magnitude of the force applied to the protection member 15 is reduced. Since the protection member 15 is fixed to the frame member 2, even when the step 13 or the base 11 comes into contact with the protection member 15, the force of the collision is received by the protection member 15 and the frame member 2. In this manner, the step 13 or the base 11 is restricted from moving beyond the protection member 15 to the width-direction inner side DXA.

Further, the flat portion 62 of the protection member 15 is formed in such a way as to contact with the upper surface of the inner end portion 11A of the base 11. The boundary 63 between the flat portion 62 and the inclination portion 61 is located on the width-direction inner side DXA of the inner end 11B of the base 11 that contacts with the flat portion 62. In the protection member 15, the inclination portion 61 is provided on the width-direction inner side DXA of the boundary 63. Thus, when a collision causes the base 11 to move to the width-direction inner side DXA, the base 11 is guided by the protection member 15. Specifically, at the time of the collision, the inner end portion 11A of the base 11 moves along the flat portion 62 without being hindered by the inclination portion 61. A part of the collision energy is absorbed by the vehicle step device 10 and the vehicle body 1 during a period until the base 11 comes into contact with the inclination portion 61 of the protection member 15. Thus, a strong force at the time of the collision is suppressed from being applied directly to the protection member 15. Then, when the inner end 11B of the base 11 reaches the inclination portion 61, the inner end portion 11A of the base 11 moves along the inclination portion 61. Thereby, the vehicle step device 10 is guided downward as a whole. Such guidance restricts the vehicle step device 10 from moving to the width-direction inner side DXA beyond the protection member 15. Thereby, the device 5 on the width-direction inner side DXA of the protection member 15 can be protected.

<Effects>

The effects of the present embodiment will be described.

(1) The vehicle step device 10 includes the protection member 15. The protection member 15 is arranged on the width-direction inner side DXA of the position of the step 13 in the retracted state, and is provided in such a way as to face at least a part of the base 11, the arm 12, and the step 13.

According to this configuration, the protection member 15 is provided in such a way as to face at least a part of the base 11, the arm 12, and the step 13. Thus, when a collision load received by the vehicle causes the base 11, the arm 12, or the step 13 to move to the vehicle width-direction inner side DXA, the base 11, the arm 12, or the step 13 can be restricted from moving to the width-direction inner side DXA beyond the protection member 15. Thereby, the device 5 located on the width-direction inner side DXA of the vehicle step device 10 can be protected. Particularly, the device 5 located on the width-direction inner side DXA of the protection member 15 can be protected.

(2) The base 11 includes the outer end portion 11C including the part located on the outermost side in the width direction DX. The outer end portion 11C is formed as the corner or the projection. According to this configuration, when the object 80 collides with the vehicle or when the vehicle collides with the object 80, the object 80 hitting the base 11 can cause the base 11 to rotate around the outer end portion 11C as the center point. Thereby, the base 11 can be suppressed from horizontally moving to the width-direction inner side DXA.

(3) The base 11 includes the outer inclination surface 37 that is inclined to a lower side from the outer end portion 11C toward the width-direction inner side DXA. According to this configuration, when the object 80 collides with the vehicle or when the vehicle collides with the object 80, the object 80 hitting the base 11 and thereby applying a force in a rotational direction around the outer end portion 11C to the base 11 can cause the base 11 to rotate until the outer inclination surface 37 comes into contact with the object 80. Thereby, the base 11 can be rotated more promptly at the time of a collision than when the base 11 is not provided with the outer inclination surface 37.

(4) The protection member 15 is arranged on the width-direction inner side DXA of the position of the base 11. The protection member 15 is provided in such a way as to face the base 11. According to this configuration, the protection member 15 is provided in such a way as to face the base 11, and thus, when a collision load received by the vehicle causes the base 11 to move to the vehicle width-direction inner side DXA, the base 11 can be restricted from moving to the width-direction inner side DXA beyond the protection member 15. Thereby, the device 5 located on the width-direction inner side DXA of the vehicle step device 10 can be protected. Particularly, the device 5 located on the width-direction inner side of the protection member 15 can be protected.

(5) The protection member 15 is fixed to the frame member 2 of the vehicle body 1. The protection member 15 is provided at the frame member 2, and thus is less likely to move at the time of a collision than the base 11 or the step 13 provided at the vehicle body 1. Thus, the protection member 15 can receive the base 11 or the step 13 moved by a collision.

(6) The protection member 15 is formed in such a way as to contact with the base 11. When the base 11 does not contact with the protection member 15, a freedom degree of movement of the base 11 at an initial stage of the time of a collision is higher than when the base 11 contacts with the protection member 15, and there is a high possibility that the base 11 moves in an unexpected direction. In this regard, according to the above-described configuration, when the base 11 moves at the time of a collision, the base 11 is easily guided by the protection member 15. Thus, movement of the base 11 can be suppressed from deviating from expected movement of the base 11 at the time of a collision.

(7) The upper end 15A of the protection member 15 is located on an upper side of the base 11. The lower end 15B of the protection member 15 is located on a lower side of the upper surface of the step 13 in the retracted state (refer to FIG. 5). According to this configuration, the base 11 can be received by the protection member 15 at the time of a collision.

(8) The protection member 15 includes the inclination portion 61 that is inclined to a lower side toward the width-direction inner side DXA in a state of being fixed to the vehicle body 1. According to this configuration, at the time of a collision, the step 13 or the base 11 can be guided downward by the protection member 15 receiving the step 13 or the base 11. Since the protection member 15 is thus formed in such a way as to change a direction of movement of the step 13 or the base 11, a strength of the protection member 15 allowed to be set low. Thereby, a weight of the protection member 15 can be reduced.

(9) The protection member 15 includes the flat portion 62 located on an outer side of the inclination portion 61 in the width direction DX. The flat portion 62 extends horizontally in a state where the protection member 15 is fixed to the vehicle body 1, and the flat portion 62 of the protection member 15 contacts with the upper surface of the inner end portion 11A of the base 11. A load applied to the step 13 in a state where the step 13 is unfolded causes a load to be applied to the base 11 via the arm 12. At this time, the base 11 is tilted, and the inner end portion 11A of the base 11 moves upward. According to the above-described configuration, the upper surface of the inner end portion 11A of the base 11 contacts with the protection member 15, and thus, upward movement of the inner end portion 11A of the base 11 is suppressed. Thereby, the position of the step 13 at the time of the load application can be stabilized.

(10) The boundary 63 between the flat portion 62 and the inclination portion 61 of the protection member 15 is located on the width-direction inner side DXA of the inner end 11B of the base 11 that contacts with the flat portion 62. When the step 13 or the base 11 comes into contact with the inclination portion 61 of the protection member 15 immediately after a collision, the protection member 15 is likely to be deformed because of a large collision force applied to the protection member 15. In this regard, according to the above-described configuration, movement of the base 11 is not restricted by the protection member 15 at the time of the collision. Thus, at the time of a collision, a part of the collision energy is absorbed by the vehicle body 1 during a period until the base 11 comes into contact with the inclination portion 61 of the protection member 15. Thereby, a force applied to the protection member 15 can be reduced.

Second Embodiment

In a second embodiment, a technique concerning the first problem is disclosed.

A vehicle step device 10 according to the second embodiment will be described. In the vehicle step device 10 of the present embodiment, the constituents common to those in the first embodiment are denoted by the same reference signs in the first embodiment, and the overlapping description is omitted. The vehicle step device 10 according to the present embodiment differs in a structure of the base 11 from the vehicle step device 10 according to the first embodiment. The following describes this point.

Figure 7:
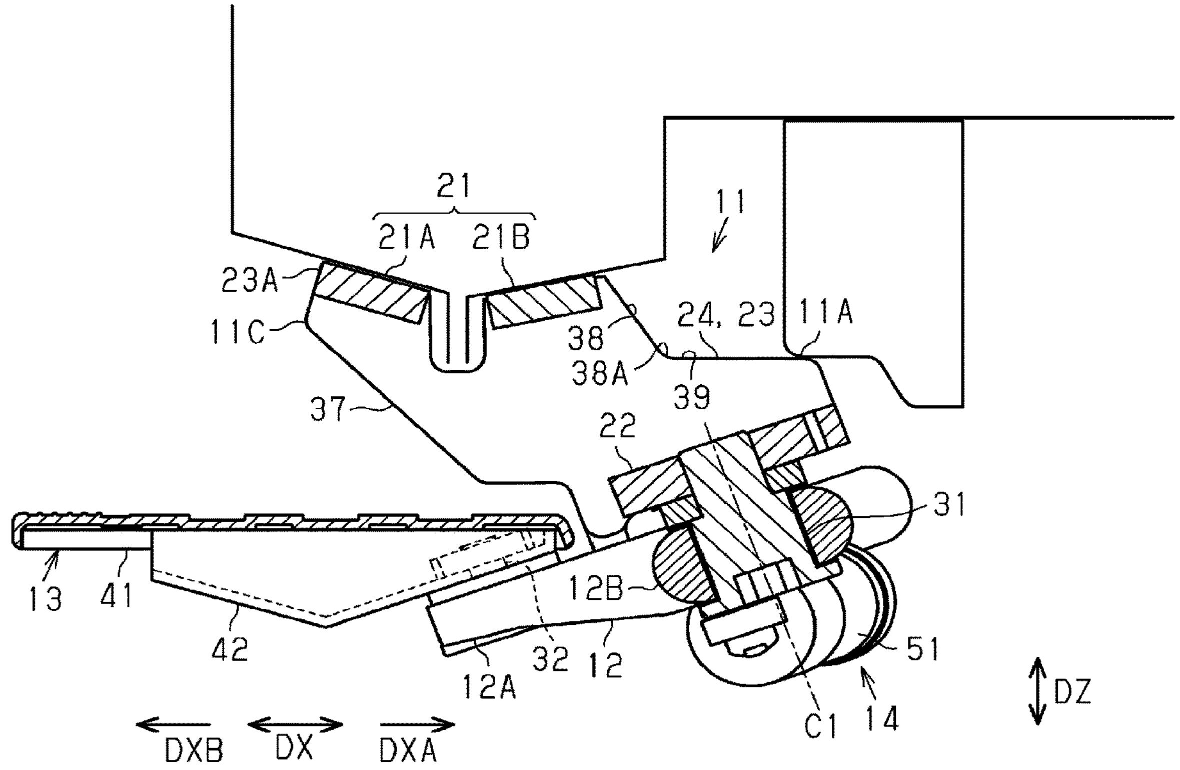
FIG. 7 is a sectional view of a vehicle step device in a second embodiment.

As illustrated in FIG. 7, the base 11 includes the fixed portion 21 that is fixed to the rocker 4 of the vehicle body 1, the arm support portion 22 that supports the arm 12, and the coupling portion 23 that couples the fixed portion 21 and the arm support portion 22 to each other.

The coupling portion 23 is formed in such a way as to extend to the width-direction inner side DXA in a state where the base 11 is fixed to the rocker 4. The fixed portion 21 is attached to the outer-end upper portion 23A of the coupling portion 23. The arm support portion 22 is attached to the lower end portion 23B that is a part included in the coupling portion 23 and located on an inner side of the outer-end upper portion 23A. The coupling portion 23 includes the first coupling portion 24 and the second coupling portion 25.

The base 11 includes the inner end portion 11A and the outer end portion 11C. The inner end portion 11A includes a part located on the innermost side in the width direction inner side DXA. The outer end portion 11C includes a part located on the outermost side in a width direction outer side DXB. The base 11 includes an outer inclination surface 37. The outer inclination surface 37 is inclined to a lower side from the outer end portion 11C toward the width-direction inner side DXA.

Further, the base 11 includes an inner inclination surface 38. The inner inclination surface 38 is formed in such a way as to partially face the protection member 15 in the width direction DX. The inner inclination surface 38 is formed in such a way as to be inclined to a lower side toward the width-direction inner side DXA.

The inner end portion 11A and the outer end portion 11C are provided in the first coupling portion 24 and the second coupling portion 25, respectively. The second coupling portion 25 has the same structure as that of the first coupling portion 24. The following describes the first coupling portion 24.

In the first coupling portion 24, the inner end portion 11A is located between an upper surface of the first coupling portion 24 and a lower surface of the first coupling portion 24 in the up-down direction DZ. The inner end portion 11A is located on the width-direction inner side DXA of the fixed portion 21.

In the first coupling portion 24, the outer end portion 11C is located near the upper surface of the base 11 in the up-down direction DZ. Specifically, the outer end portion 11C is located on an upper side of an inner lower end 38A of the inner inclination surface 38 in the up-down direction DZ. In another example, the outer end portion 11C is located on an upper side of an intermediate position between the upper surface of the first coupling portion 24 and the lower surface of the first coupling portion 24 in the up-down direction DZ. In another example, the outer end portion 11C is located on an upper side of the gravity center of the first coupling portion 24. Further, in another example, the outer end portion 11C is located on an upper side of the inner end portion 11A in the up-down direction DZ.

The inner inclination surface 38 is located on an upper side of the inner end portion 11A in the up-down direction DZ. The inner inclination surface 38 is located on an outer side of the inner end portion 11A in the width direction DX. The inner lower end 38A in the inner inclination surface 38 is at a position lower than the outer end portion 11C of the base 11. A flat portion 39 that extends horizontally is provided between the inner inclination surface 38 and the inner end portion 11A. A length of the flat portion 39 is longer than a length of the flat portion 62 of the protection member 15. Thereby, when the vehicle step device 10 moves horizontally due to a vehicle collision, the inner end 11B of the base 11 moves as far as the boundary 63 of the protection member 15, in a state of contacting with the flat portion 62 of the protection member 15. In such a manner, the horizontal movement of the vehicle step device 10 is allowed over a predetermined distance. Because of this allowance, a strong force at an initial stage of the collision is suppressed from being transmitted directly to the protection member 15. When the vehicle step device 10 moves over the predetermined distance due to the collision, the inner inclination surface 38 of the base 11 comes into contact with an outer end 62A of the flat portion 62 of the protection member 15.

<Effects>

Effects of the present embodiment will be described with reference to FIG. 8 to FIG. 11.

Figure 8:
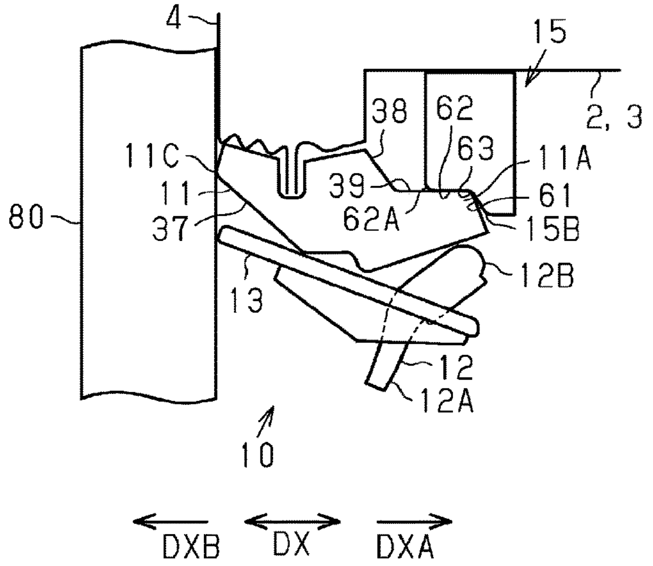
FIG. 8 is a sectional view of the vehicle step device and a vehicle body at the time of a collision.

As illustrated in FIG. 8, at the time of a vehicle collision, the object 80 hits the step 13, and then comes into contact with the outer end portion 11C of the base 11. The outer end portion 11C is formed as the corner or the projection, and thus, when the object 80 comes into contact with the outer end portion 11C of the base 11, the base 11 rotates around the outer end portion 11C. Since the base 11 is provided with the outer inclination surface 37, the base 11 rotates in such a way that the inner end portion 11A of the base 11 moves downward. Further, since the outer end portion 11C of the base 11 is arranged near the upper surface, the inner end portion 11A of the base 11 easily rotates in such a way as to move downward.

At an initial stage of a collision, the vehicle step device 10 moves horizontally. The flat portion 62 of the protection member 15 is formed in such a way as to contact with the upper surface of the inner end portion 11A of the base 11. The boundary 63 between the flat portion 62 and the inclination portion 61 is located on the width-direction inner side DXA of the inner end 11B of the base 11 that contacts with the flat portion 62. Thus, the inner end portion 11A of the base 11 moves along the flat portion 62 without being hindered by the inclination portion 61 of the protection member 15. A part of the collision energy is absorbed by the vehicle step device 10 and the vehicle body 1 during a period until the base 11 comes into contact with the inclination portion 61 of the protection member 15. Thus, a strong force at the time of the collision is suppressed from being applied directly to the protection member 15.

Figure 9:
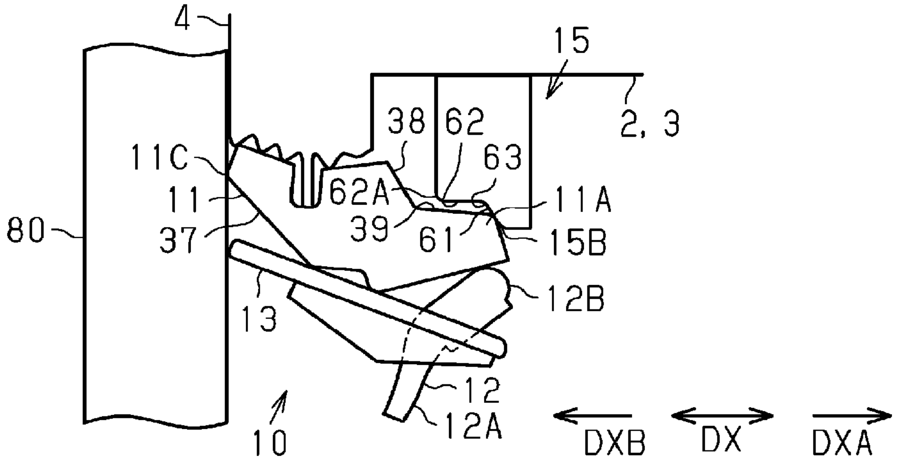
FIG. 9 is a sectional view of the vehicle step device and the vehicle body at the time of the collision.

Then, as illustrated in FIG. 9, when the inner end 11B of the base 11 reaches the inclination portion 61, the inner end portion 11A of the base 11 moves along the inclination portion 61. Thereby, the vehicle step device 10 is guided downward as a whole.

Figure 10:
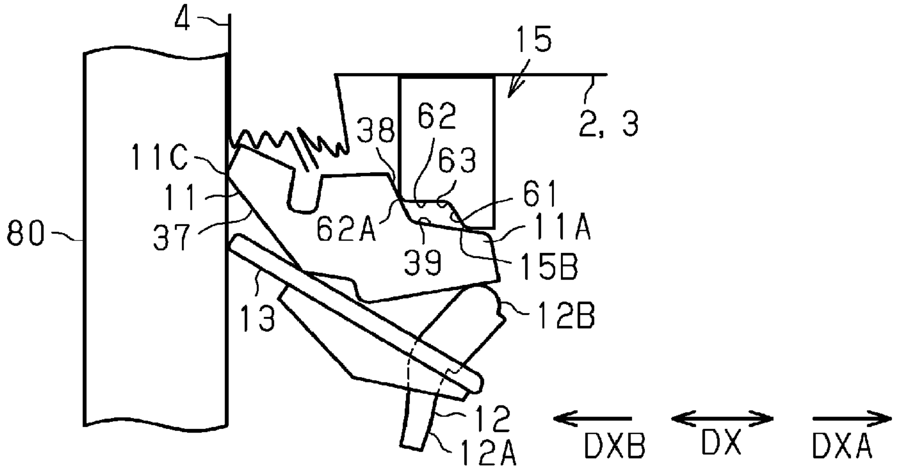
FIG. 10 is a sectional view of the vehicle step device and the vehicle body at the time of the collision.

As illustrated in FIG. 10, when the vehicle step device 10 further moves to the width-direction inner side DXA, the inner inclination surface 38 of the base 11 comes into contact with the outer end 62A of the flat portion 62 of the protection member 15. This contact guides the base 11 downward.

Figure 11:
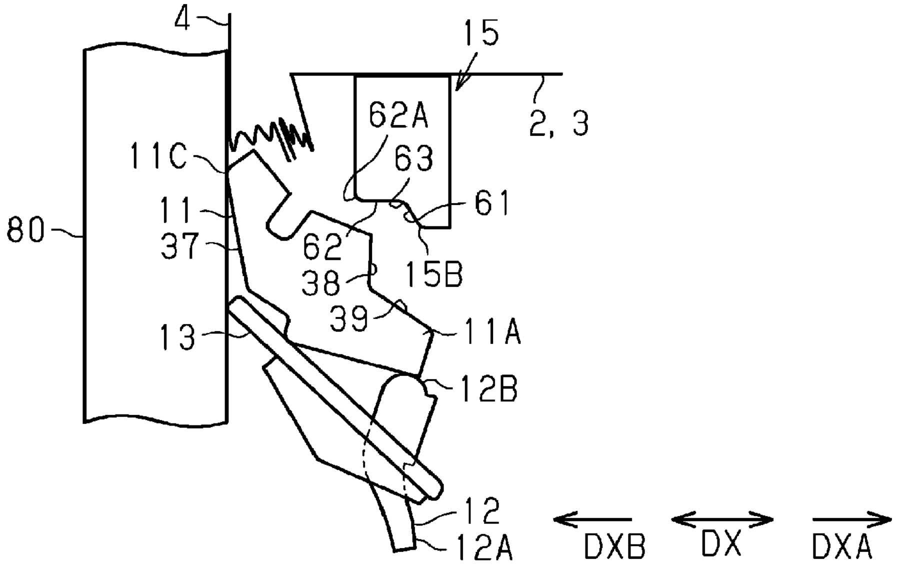
FIG. 11 is a sectional view of the vehicle step device and the vehicle body at the time of the collision.

After that, as illustrated in FIG. 11, the vehicle step device 10 moves downward due to the momentum and its own weight. In such a manner, the vehicle step device 10 is suppressed from moving to the width-direction inner side DXA beyond the protection member 15.

As described above, at the time of a collision and after the collision, a force of moving the base 11 downward or a force of rotating the base 11 in such a way that the inner end portion 11A moves downward acts on the base 11. The first force is torque that acts on the base 11 when the object 80 comes into contact with the outer end portion 11C of the base 11. The second force is downward force that acts on the base 11 when the inner end 11B of the base 11 comes into contact with the inclination portion 61 of the protection member 15. The third force is downward force that acts on the base 11 when the inner inclination surface 38 of the base 11 comes into contact with the outer end 62A of the flat portion 62 of the protection member 15. Since these three forces act on the base 11 at the time of the collision and after the collision, the vehicle step device 10 can be guided downward in various situations.

<Advantageous Effects>

Advantageous effects of the present embodiment will be described.

In the vehicle step device 10, the base 11 includes the inner inclination surface 38 that faces the protection member 15 in the width direction DX. The inner inclination surface 38 is inclined to a lower side toward the width-direction inner side DXA. According to this configuration, in a case where the object 80 collides with the vehicle or in a case where the vehicle collides with the object 80, when the vehicle step device 10 moves to the width-direction inner side DXA, the inner inclination surface 38 of the base 11 comes into contact with the outer end 62A of the flat portion 62 of the protection member 15, and thereby, the base 11 is guided downward. Thereby, the base 11 is suppressed from moving to the width-direction inner side DXA beyond the protection member 15.

Modified Examples

The above-described embodiments (the first embodiment and the second embodiment) are not limited to the above-described configuration examples. The above-described embodiments can be modified as in the following. In the following modified examples, structures that are not substantially modified from the structures in the above-described embodiments are described while being denoted by the same reference signs as those of the structures in the above-described embodiments.

In the first embodiment and the second embodiment, the protection member 15 includes the inclination portion 61. A shape of the inclination portion 61 may be defined by a curved surface. The inclination portion 61 may be constituted by a plurality of flat surfaces. The inclination portion 61 may be constituted by a curved surface and a flat surface.

In the first embodiment and the second embodiment, the protection member 15 is fixed to the side member 3. In contrast to this, the protection member 15 may be fixed to a cross member. The protection member 15 may be formed in such a way as to reach the front and rear cross members.

In the first embodiment and the second embodiment, the drive unit 14 moves the step 13 relative to the base 11. In contrast to this, the drive unit 14 may be configured in such a way as to move the step 13 relative to the vehicle body 1. For example, the drive unit 14 includes the expansion-contraction unit 51. In this case, one of the body portion 52 and the movement portion 53 of the expansion-contraction unit 51 is connected to the step 13. The other of the body portion 52 and the movement portion 53 of the expansion-contraction unit 51 is connected to the vehicle body 1.

In the first embodiment and the second embodiment, the drive unit 14 includes the expansion-contraction unit 51. A configuration of the drive unit 14 is not limited to this. The drive unit 14 may have a structure of rotating the arm 12 via gears. The drive unit 14 may have a structure of rotating the arm 12 by a rack and a pinion. The drive unit 14 may be omitted. In this case, the step 13 of the vehicle step device 10 is moved manually.

In the first embodiment and the second embodiment, the lower end 15B of the protection member 15 may extend further down. Specifically, the lower end 15B of the protection member 15 may be located below the lower surface of the step 13 in the stored state.

In the first embodiment and the second embodiment, the base 11 includes the outer inclination surface 37. A shape of the outer inclination surface 37 is not limited. For example, the outer inclination surface 37 may be constituted by a curved surface. The outer inclination surface 37 may be constituted by a plurality of flat surfaces. The outer inclination surface 37 may be constituted by a curved surface and a flat surface.

In the first embodiment and the second embodiment, the base 11 includes the inner inclination surface 38. A shape of the inner inclination surface 38 is not limited. For example, the inner inclination surface 38 may be constituted by a curved surface. The inner inclination surface 38 may be constituted by a plurality of flat surfaces. The inner inclination surface 38 may be constituted by a curved surface and a flat surface.

Third Embodiment

In the second embodiment, a technique concerning the second problem is disclosed.

A vehicle step device 101 according to the second embodiment will be described with reference to FIG. 12 to FIG. 23. The vehicle step device 101 is attached directly or indirectly to a vehicle body 102. In the following description, a state in which the vehicle step device 101 is attached directly or indirectly to the vehicle body 102 is referred to as the "the attached state of the vehicle step device 101".

A front-rear direction DY of the vehicle step device 101 matches a front-rear direction DYS of the vehicle body 102 in the attached state of the vehicle step device 101. A width direction DX of the vehicle step device 101 matches a width direction DXS of the vehicle body 102 in the attached state of the vehicle step device 101. An up-down direction DZ of the vehicle step device 101 matches the up-down direction DZS of the vehicle body 102 in the attached state of the vehicle step device 101.

<Vehicle>

Figure 12:
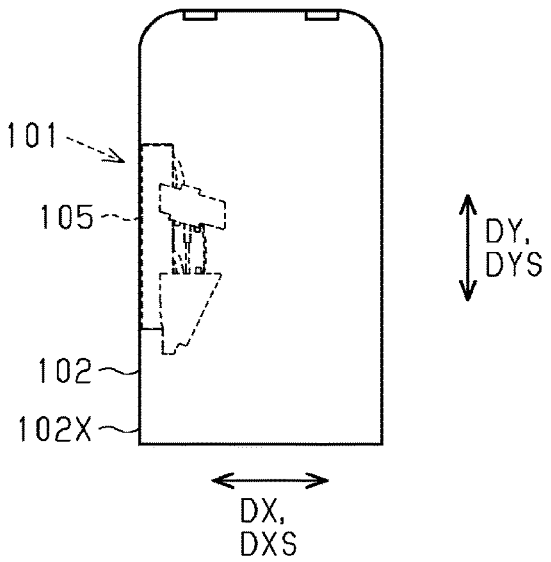
FIG. 12 is a plan view of a vehicle including a vehicle step device according to a third embodiment.

As illustrated in FIG. 12, the vehicle step device 101 is provided at the vehicle body 102. The vehicle step device 101 may be attached directly to the vehicle body 102. The vehicle step device 101 may be attached to the vehicle body 102 via a base 103. The vehicle step device 101 may be attached to the vehicle body 102 via a support member 109.

The vehicle step device 101 is attached to a lower surface of a bottom plate of the vehicle body 102. On the bottom plate of the vehicle body 102, the vehicle step device 101 is attached near a vehicle entrance that is closed by a door. A step 105 of the vehicle step device 101 is used as an auxiliary step for getting on and off. Thus, the step 105 of the vehicle step device 101 is arranged on a lower side of a lower end of the vehicle entrance. The step 105 of the vehicle step device 101 is moved by power of a motor 153. The step 105 of the vehicle step device 101 is moved from a retracted position of being accommodated under the bottom plate of the vehicle body 102 to a deployed position, in response to a predetermined operation command at the time of getting on and off. The deployed position (refer to FIG. 22) is located separate, relative to the vehicle body 102, outward in the width direction DX from the retracted position (refer to FIG. 23). When the step 105 is moved as far as the deployed position, the step 105 is arranged in such a way that at least a part of the step 105 is exposed from the vehicle body 102 in a plan view.

Figure 13:
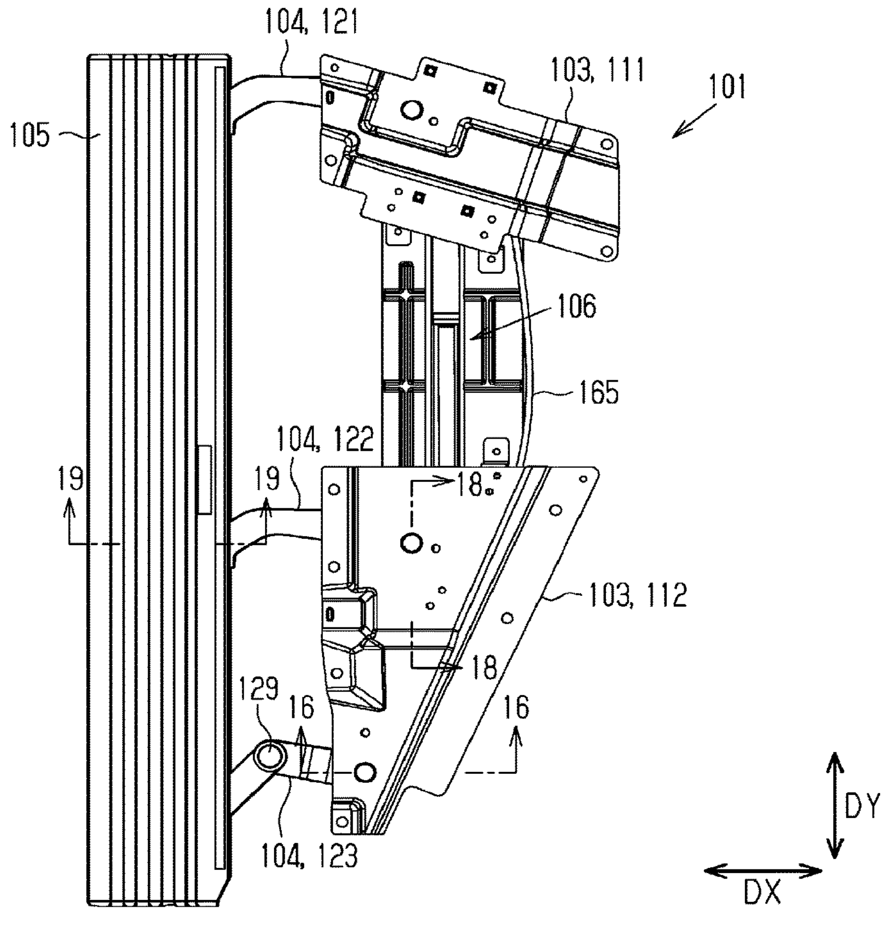
FIG. 13 is a plan view of the vehicle step device.

As illustrated in FIG. 13, the vehicle step device 101 includes an arm 104, the step 105 that is attached to the arm 104, and a drive unit 106 that drives the arm 104. In the present embodiment, the vehicle step device 101 includes the three arms 104. In the vehicle step device 101, the three arms 104 are referred to as the first arm 121, the second arm 122, and the third arm 123 in order from a front side. When the first arm 121 to the third arm 123 are not distinguished from each other, these arms are referred to simply as the arms 104.

The arm 104 is attached to a vehicle body structure 102X that includes the vehicle body 102. The vehicle body structure 102X may be only the vehicle body 102. The vehicle body structure 102X may include the vehicle body 102, and the support member 109 that supports the arm 104. The vehicle body structure 102X may include the vehicle body 102, the base 103 attached to the vehicle body 102, and the support member 109.

For example, the arm 104 is attached directly to vehicle body 102. The arm 104 may be attached to the vehicle body 102 via the base 103. The arm 104 may be attached to the support member 109 that is fixed to the base 103. In the present embodiment, the arm 104 is attached to the vehicle body 102 via the base 103 and the support member 109.

<Base>

Figure 14:
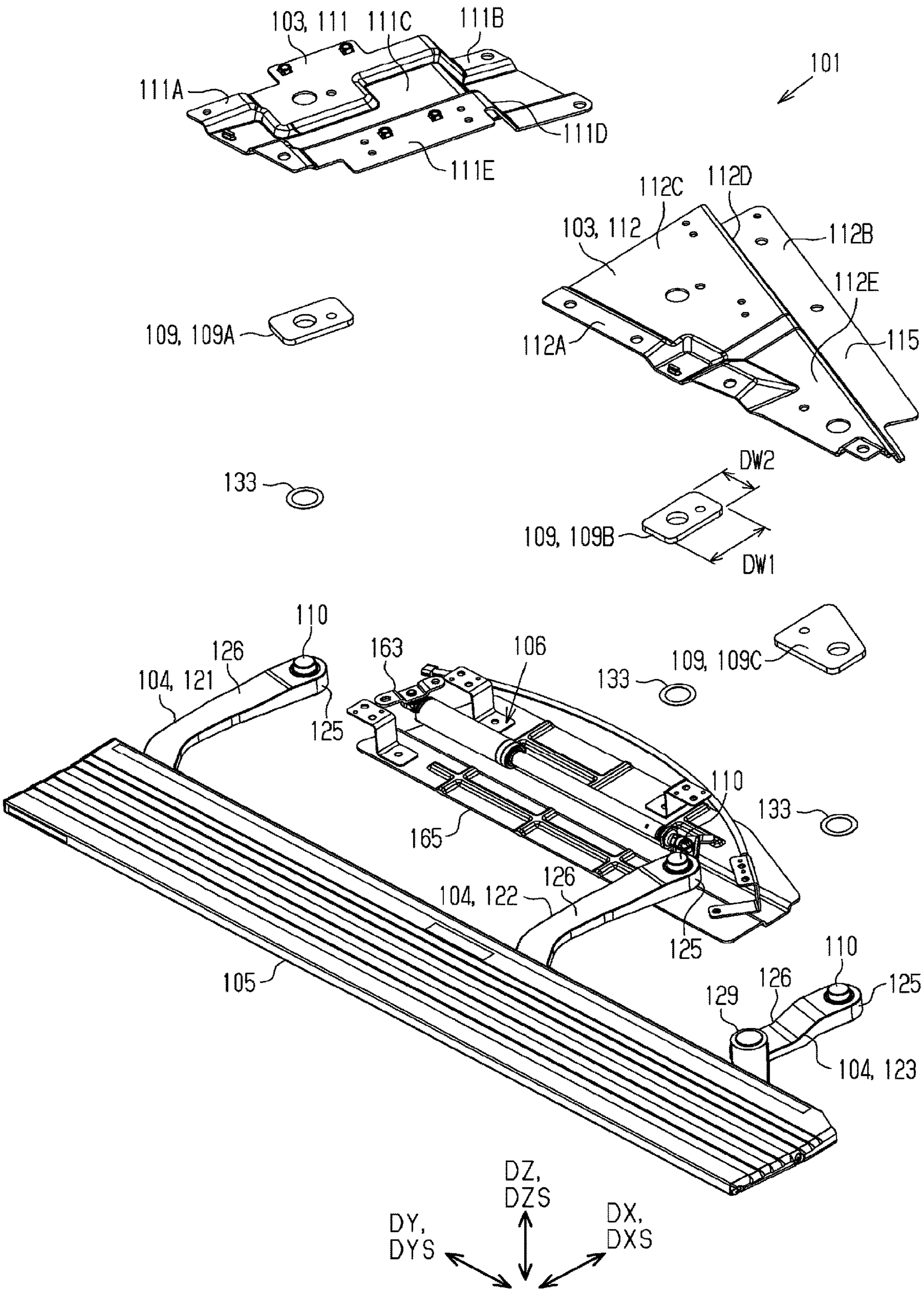
FIG. 14 is an exploded perspective view of the vehicle step device.

As illustrated in FIG. 14, the base 103 includes a first base 111 and a second base 112. The first base 111 is arranged on a front side of the second base 112 in the vehicle body 102. The first base 111 supports a base portion 125 of the first arm 121. The second base 112 supports a base portion 125 of the second arm 122 and a base portion 125 of the third arm 123.

The first base 111 includes a first fastened portion 111A, a second fastened portion 111B that is arranged on an inner side of the first fastened portion 111A in the width direction DX, and a first intermediate portion 111C that is between the first fastened portion 111A and the second fastened portion 111B.

The second fastened portion 111B is provided at position higher than the first intermediate portion 111C in the up-down direction DZ. The second fastened portion 111B is connected to the first intermediate portion 111C via a first stepped portion 111D. The first fastened portion 111A and the second fastened portion 111B are fastened to the vehicle body 102 with screws or rivets. The first intermediate portion 111C of the first base 111 includes a shaft support portion 111X that supports a shaft member 110 of the first arm 121. A first support member 109A having a plate shape is fixed to the shaft support portion 111X of the first intermediate portion 111C of the first base 111. The first arm 121 is attached to the first support member 109A.

Figure 15:
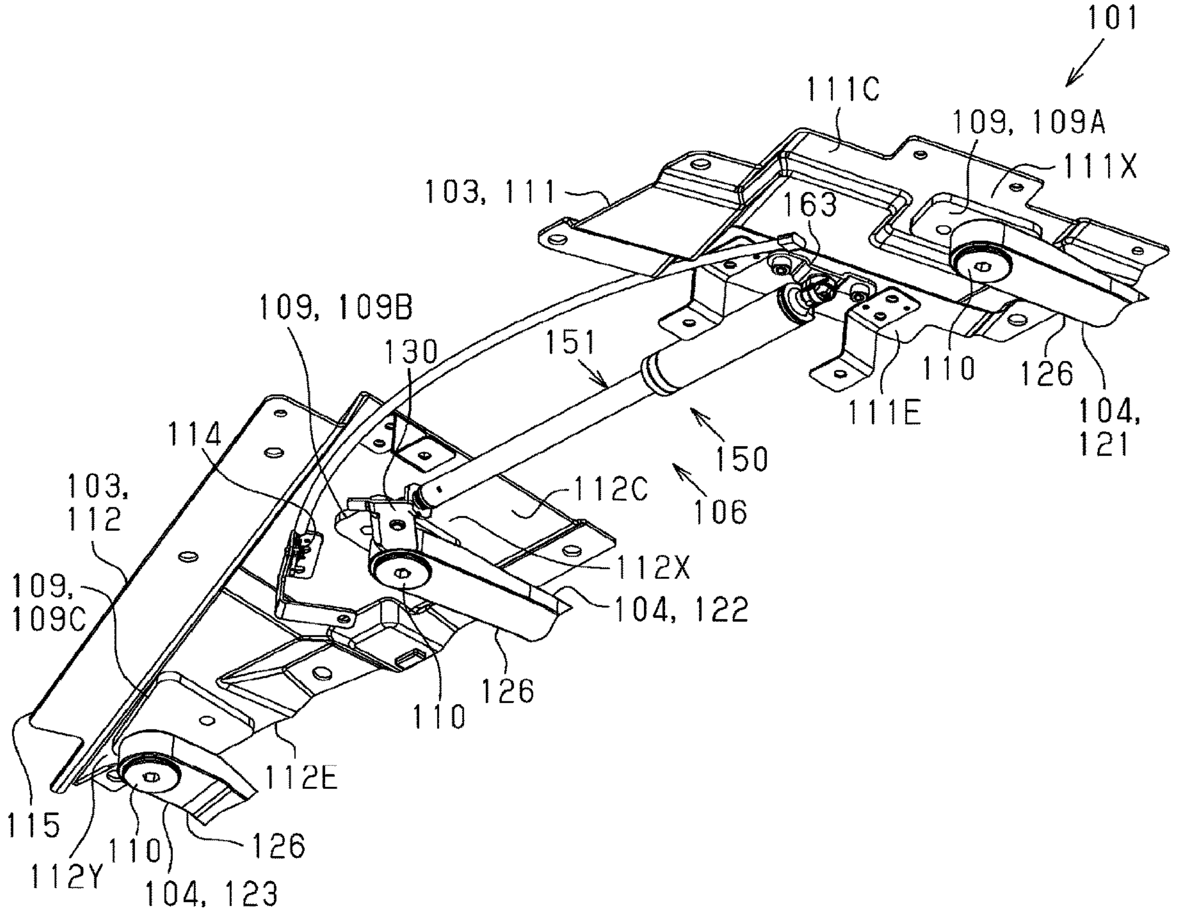
FIG. 15 is a perspective view of the vehicle step device when viewed from a lower side.

As illustrated in FIG. 15, the first base 111 further includes an expansion-contraction unit support portion 111E. The expansion-contraction unit support portion 111E is provided in such a way as to protrude rearward from the first intermediate portion 111C. The expansion-contraction unit support portion 111E supports a body portion 151 of the expansion-contraction unit 150.

As illustrated in FIG. 14, the second base 112 includes a third fastened portion 112A, a fourth fastened portion 112B, a second intermediate portion 112C, and a rear portion 112E that extends rearward from the second intermediate portion 112C. The fourth fastened portion 112B is a part arranged closer to the center of the vehicle body in the width direction DX than the third fastened portion 112A is. The second intermediate portion 112C is a part between the third fastened portion 112A and the fourth fastened portion 112B.

The fourth fastened portion 112B is provided at a position higher than the second intermediate portion 112C in the un-down direction DZ. The fourth fastened portion 112B is connected to the second intermediate portion 112C via a second stepped portion 112D. The third fastened portion 112A and the fourth fastened portion 112B are fastened to the vehicle body 102 with screws or rivets. The third fastened portion 112A and the fourth fastened portion 112B may be attached to the vehicle body 102 by welding or the like.

The fourth fastened portion 112B of the second base 112 is fastened to the vehicle body 102 by screws arranged in a single line. The second intermediate portion 112C of the second base 112 includes a shaft support portion 112X that supports a shaft member 110 of the second arm 122. A second support member 109B having a plate shape is fixed to the shaft support portion 112X of the second intermediate portion 112C of the second base 112. The second arm 122 is attached to the second support member 109B. Further, the rear portion 112E of the second base 112 includes a shaft support portion 112Y that supports a shaft member 110 of the third arm 123. A third support member 109C having a plate shape is fixed to the shaft support portion 112Y of the rear portion 112E of the second base 112. The third arm 123 is attached to the third support member 109C.

As illustrated in FIG. 15, the second base 112 is provided with a switch 114. By on-operation of the switch 114, the switch 114 outputs a signal for stopping operation of the drive unit 106. The switch 114 is arranged at a position where the extension portion 130 of the second arm 122 can come into contact with the switch 114. Specifically, the switch 114 is arranged in such a way that the extension portion 130 of the second arm 122 comes into contact with a lever of the switch 114 in arrangement of the second arm 122 when the step 105 is arranged at the retracted position.

Figure 16:
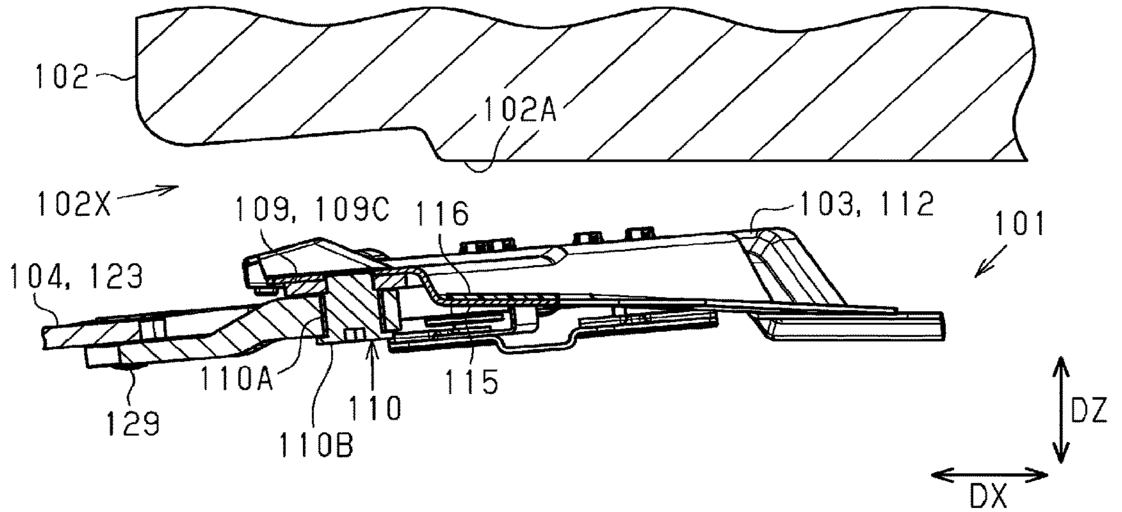
FIG. 16 is a sectional view of the vehicle step device taken along the 16-16 line in FIG. 13.

As illustrated in FIG. 16 and FIG. 17, the second base 112 includes a contact portion 115 that comes into contact against a lower surface of the vehicle body 102. The contact portion 115 is arranged closer to the center of the vehicle body in the width direction DX than the third fastened portion 112A is. The contact portion 115 is provided at least on a front side of or on a rear side in the second base 112.

The contact portion 115 is provided at an extension association part 103A of the base 103. The extension association part 103A is a part that is included in the base 103 and at which an imaginary extension portion 123X and the second base 112 overlap with each other. The imaginary extension portion 123X indicates an extension portion when the third arm 123 is made to extend in a direction opposite to a direction in which the arm portion 126 extends relative to the base portion 125 of the third arm 123 in a case where the arm 104 is arranged at the deployed position in the attached state of the vehicle step device 101.

Further, the contact portion 115 may be provided at a part that is the extension association part 103A and that is also a screw extension portion 103B. The screw extension portion 103B indicates an extension portion when the fourth fastened portion 112B is made to extend in a direction DS along the line of the screws of the fourth fastened portion 112B in the base 103.

As illustrated in FIG. 16, the vehicle step device 101 may include a cushioning member 116.

The cushioning member 116 is provided between the contact portion 115 and a contacted part 102A that is included in the vehicle body 102 and against which the contact portion 115 comes into contact. The cushioning member 116 is formed into a sheet shape. The cushioning member 116 may be adhered to the contacted part 102A of the vehicle body 102. The cushioning member 116 may be provided on the contact portion 115. The cushioning member 116 is provided in order to suppress peeling of paint on the vehicle body 102 due to direct contact between the contact portion 115 and the vehicle body 102, or in order to suppress vibration noise caused by direct contact between the contact portion 115 and the vehicle body 102. The cushioning member 116 is constituted by a rubber sheet or a resin sheet. The cushioning members 116 may be provided on both of the contacted part 102A of the vehicle body 102 and the contact portion 115.

<Support Member>

The support member 109 is provided directly or indirectly on the vehicle body 102. In one example, the support member 109 is attached to the base 103. The support member 109 is made of metal. The support member 109 is formed as a plate member having a predetermined thickness. The thickness of the support member 109 is larger than a thickness of the base 103. The support member 109 is fixed to the base 103 by welding. The support member 109 includes a first support member 109A to a third support member 109C.

At least one of the first support member 109A to the third support member 109C may have the following formation. In the attached state of the vehicle step device 101, a first width DW1 of the support member 109 along the width direction DX is larger than a second width DW2 of the support member 109 along a direction perpendicular to the width direction DX (refer to FIG. 14).

At least one of the first support member 109A to the third support member 109C may have the following formation. In the attached state of the vehicle step device 101, both end portions of the support member 109 in the width direction DX are more firmly fixed to the vehicle body 102 or the base 103 fixed to the vehicle body 102 than both end portions of the support member 109 in a direction intersecting with the width direction DX are.

<Arm>

Each of the arms 104 includes the base portion 125 and the arm portion 126. The arm portion 126 extends from the base portion 125 toward the step 105. The base portion 125 of each of the arms 104 is rotatably attached to the base 103. Rotational axes of the base portions 125 of the respective arms 104 are parallel to each other. The base portion 125 includes a penetration hole 125A through which the shaft member 110 is inserted. The shaft member 110 is inserted into the penetration hole 125A.

The base portion 125 is supported by the vehicle body 102 or the base 103 via the support member 109. Specifically, the arm 104 is rotatably attached to the vehicle body structure 102X by the support member 109 and the shaft member 110. The distal end portion 128 of the arm 104 includes a penetration hole 128A through which a step shaft member 141 is inserted (refer to FIG. 19).

The arm portion 126 of the third arm 123 includes a joint portion 129 (refer to FIG. 14). The arm portion 126 of the third arm 123 bends and stretches around an axis provided at the joint portion 129. Since the third arm 123 includes the joint portion 129, the step 105 moves smoothly.

The second arm 122 includes a base portion 125, an arm portion 126, and an extension portion 130 (refer to FIG. 15). The extension portion 130 may be formed as a member separate from the base portion 125 and the arm portion 126. The extension portion 130 extends at the base portion 125 in a direction opposite to the arm portion 126. The extension portion 130 includes a first part 130A where a ball portion 161 of a ball joint 160 is provided, and a second part 130B that extends from the first part 130A (refer to FIG. 21). The second portion 130B is provided at the first portion 130A in such a way as to come into contact against the switch 114 when the second arm 122 is arranged at an arm retracted position. The arm retracted position is a position of the second arm 122 when the step 105 is arranged at the retracted position.

A support structure for the arm 104 will be described with reference to FIG. 18. FIG. 18 is a sectional view of the base portion 125 of the second arm 122. FIG. 18 omits an illustration of the second base 112.

As illustrated in FIG. 18, the shaft member 110 is attached to the support member 109. The shaft member 110 includes a shaft body portion 110A that is attached to the support member 109 through the penetration hole 125A of the arm 104, and a head portion 110B that is provided at an end of the shaft body portion 110A. The base portion 125 of the arm 104 is sandwiched and held by the head portion 110B and the support member 109.

An end portion of the shaft member 110 is joined to the support member 109 in a state where the shaft body portion 110A is inserted into the penetration hole 125A of the arm 104. A bush 132 is arranged between the penetration hole 125A and the shaft member 110. The head portion 110B of the shaft member 110 supports a lower surface of the base portion 125 of the arm 104. A washer 133 is arranged between the head portion 110B of the shaft member 110 and the base portion 125 of the arm 104. A washer 133 is arranged between the support member 109 and the base portion 125 of the arm 104.

A distal end portion 128 of the arm 104 is rotatably attached to the step 105. The distal portion 128 of each of the arms 104 is attached to a part included in the step 105 and closer to the vehicle body in the width direction DX. The rotational axes of the distal end portions 128 of the respective arms 104 are parallel to each other.

Figure 19:
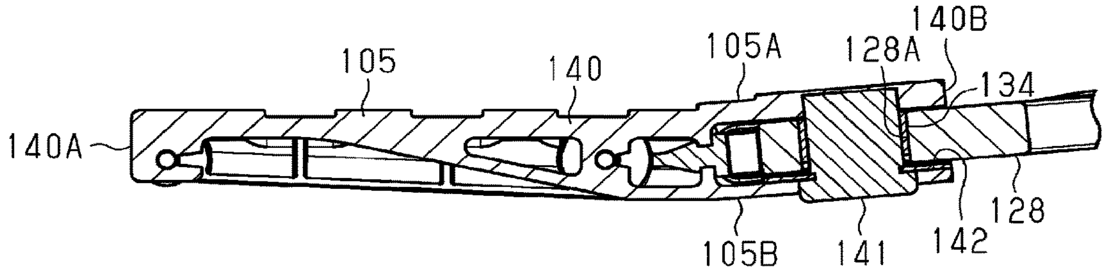
FIG. 19 is a sectional view of the vehicle step device taken along the 19-19 line in FIG. 13.

As illustrated in FIG. 19, the distal end portion 128 of the arm 104 is provided with a penetration hole 128A. The step shaft member 141 is inserted into the penetration hole 128A. An upper end portion of the step shaft member 141 is joined to an upper surface portion 105A of the step 105 in a state where the step shaft member 141 is inserted into the penetration hole 128A of the arm 104. A lower end portion of the step shaft member 141 is joined to a lower surface portion 105B of the step 105 in the state where the step shaft member 141 is inserted into the penetration hole 128A of the arm 104. A bush 134 is arranged between the penetration hole 128A and the step shaft member 141.

<Step>

The step 105 is supported by the first arm 121, the second arm 122, and the third arm 123. The step 105 is supported by the first arm 121 to the third arm 123 in such a way as to be movable relative to the vehicle body 102. The step 105 includes a step body portion 140. For example, the step body portion 140 is made of aluminum or an aluminum alloy. The step body portion 140 is formed by extrusion or drawing.

As illustrated in FIG. 19, the step body portion 140 includes a first side surface 140A and a second side surface 140B that is arranged closer to the vehicle body in the width direction DX than the first side surface 140A is. A groove portion 142 is provided on the second side surface 140B, and is concave toward the first side surface 140A. The groove portion 142 is open toward the vehicle body 102 in the attached state of the vehicle step device 101. The groove portion 142 is formed in such a way as to receive the distal end portion 128 of the arm 104.

<Drive Unit>

The drive unit 106 includes an expansion-contraction unit 150. The expansion-contraction unit 150 includes a body portion 151 and a movement portion 152 that moves relative to the body portion 151. The body portion 151 is connected directly or indirectly to the vehicle body 102. The movement portion 152 is connected to the arm 104.

Figure 20:
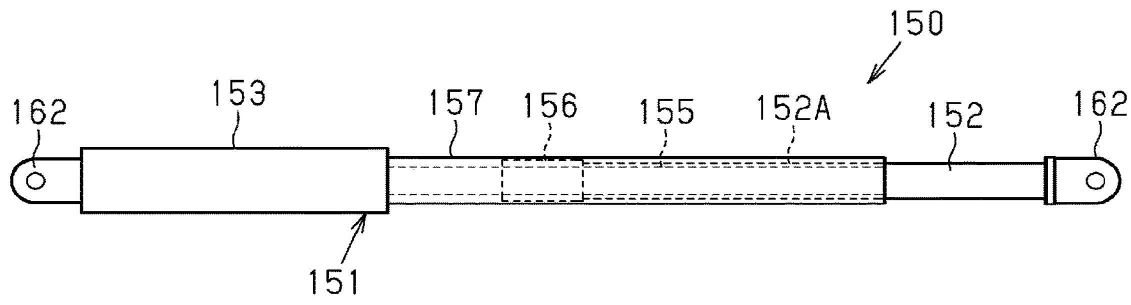
FIG. 20 is a schematic diagram of an expansion-contraction unit.

As illustrated in FIG. 20, the body portion 151 includes a spindle 155 that is rotated by a motor 153, a nut 156 that engages with the spindle 155, and an outer cylinder 157. The outer cylinder 157 guides the nut 156 in such a way that the nut 156 moves along the spindle 155 by rotation of the spindle 155.

In one example, the body portion 151 includes the motor 153. The motor 153 is attached to an end of outer cylinder 157. The spindle 155 and the nut 156 are accommodated in the outer cylinder 157. The movement portion 152 includes a cylindrical portion 152A. The cylinder portion 152A of the movement portion 152 is inserted into the outer cylinder 157. The nut 156 is attached to an end portion of the cylindrical portion 152A of the movement portion 152. When the spindle 155 rotates, the movement portion 152 moves along the spindle 155 together with the nut 156.

The body portion 151 is rotatably attached to the vehicle body 102 or the base 103.

For example, the body portion 151 is attached to the vehicle body 102 or the base 103 via a ball joint 160. The ball joint 160 includes a ball portion 161 and a ball reception portion 162 that receives the ball portion 161. The ball portion 161 is attached directly or indirectly to the vehicle body 102. The ball reception portion 162 is provided at an end portion of the body portion 151.

Figure 21:
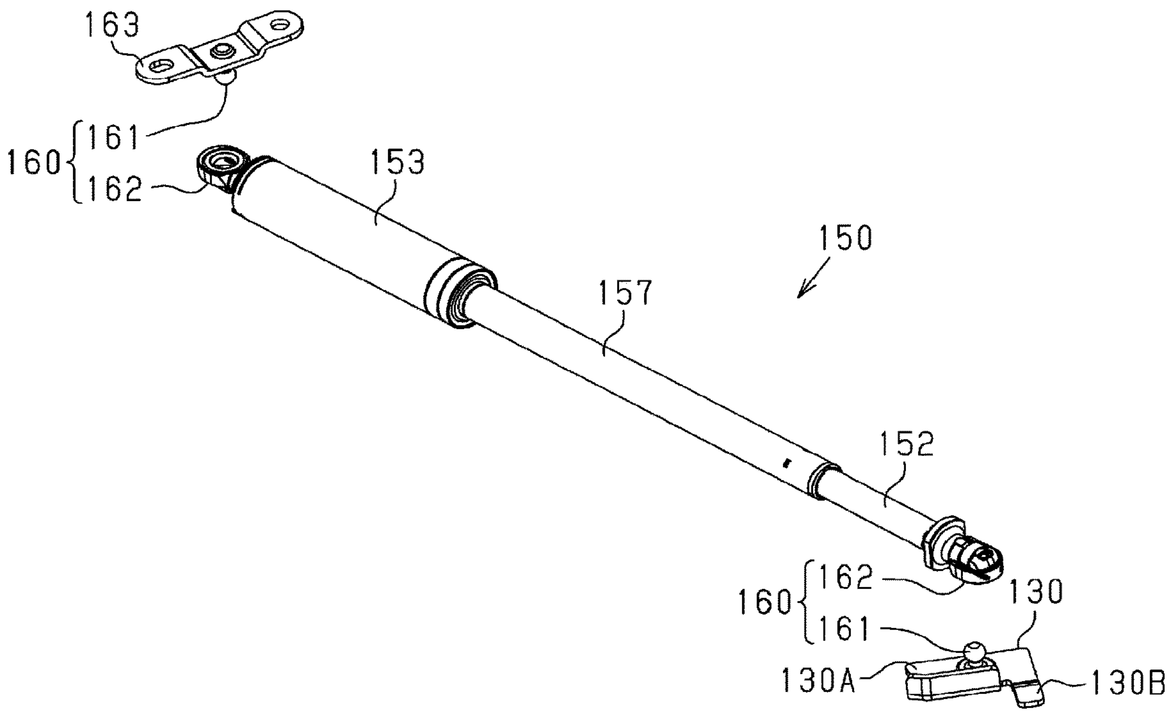
FIG. 21 is a perspective view of the expansion-contraction unit.

As illustrated in FIG. 21, the body portion 151 is detachably attached to the vehicle body 102 or the base 103 by screws. Specifically, the ball portion 161 of the ball joint 160 is fixed to an attachment member 163. The attachment member 163 is attached to the expansion-contraction unit support portion 111E of the first base 111 by screws (refer to FIG. 15). The attachment member 163 is attached in such a way that the attachment member 163 can be detached from the expansion-contraction unit support portion 111E of the first base 111 by loosening the screws.

A distal end portion of the movement portion 152 is rotatably attached to the extension portion 130 of the second arm 122 (refer to FIG. 15). Specifically, a distal end portion of the spindle 155 is attached to the extension portion 130 of the second arm 122 via a ball joint 160. The ball joint 160 includes a ball portion 161 and a ball reception portion 162 that receives the ball portion 161. The ball portion 161 is attached to the extension portion 130 of the second arm 122. The ball reception portion 162 is provided at the distal end portion of the movement portion 152.

Figure 22:
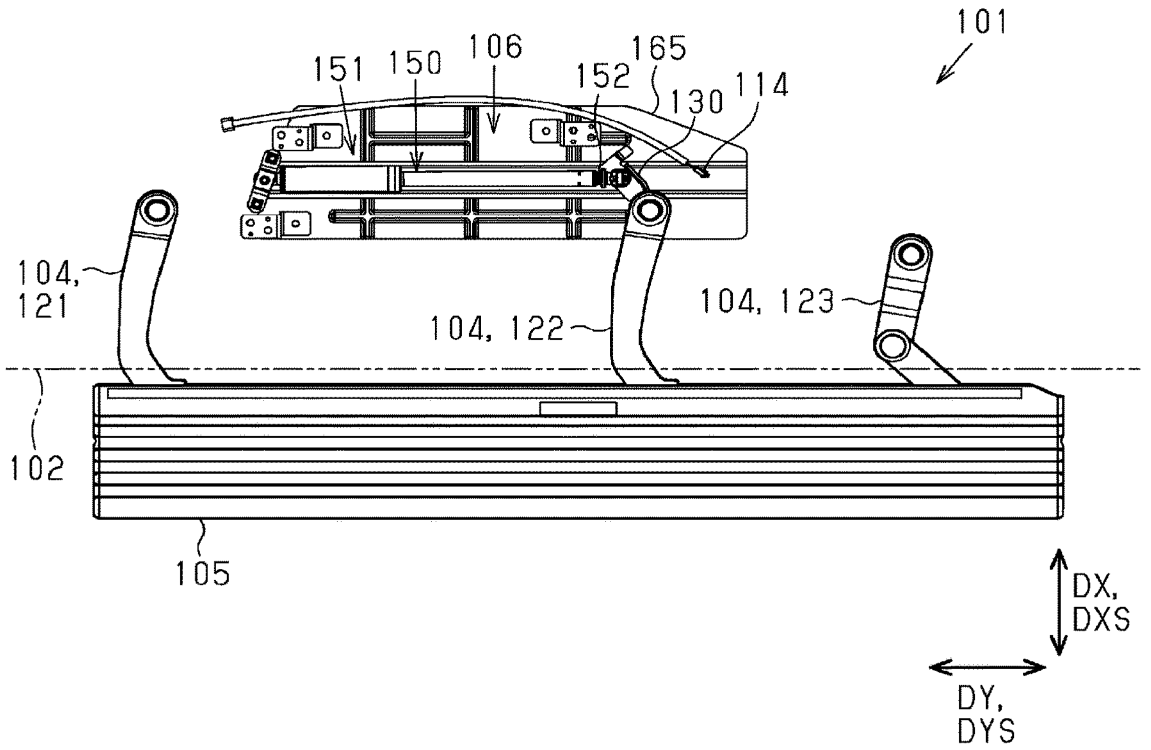
FIG. 22 is a plan view of the vehicle step device when the step is arranged at a deployed position.
Figure 23:
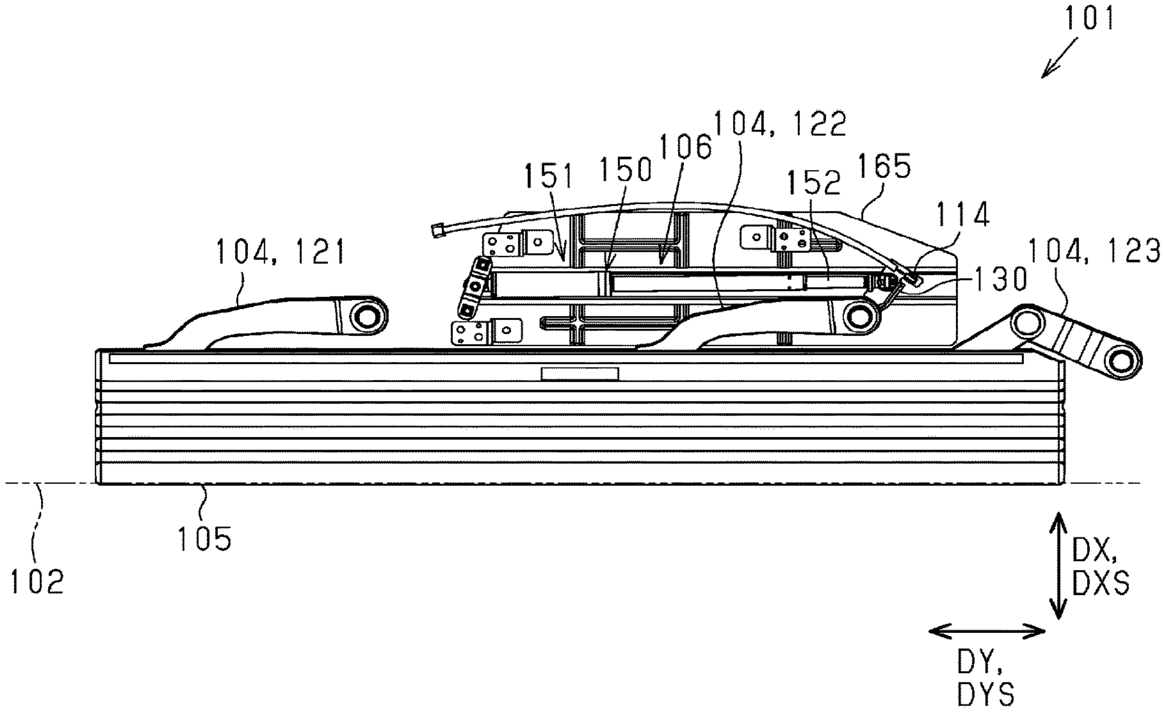
FIG. 23 is a plan view of the vehicle step device when the step is arranged at a retracted position.

As illustrated in FIG. 22 and FIG. 23, the expansion-contraction unit 150 is arranged in such a way that the spindle 155 is arranged along the front-rear direction DYS of the vehicle body 102 in the attached state where the vehicle step device 101 is attached to the vehicle body 102 or the base 103. In the state where the vehicle step device 101 is attached to the vehicle body 102, the movement portion 152 is connected to the arm 104 in such a way that the expansion-contraction unit 150 expands and contracts in the front-rear direction DYS of the vehicle body 102.

The vehicle step device 101 may further include a reception member 165. The reception member 165 receives the expansion-contraction unit 150. The reception member 165 is provided in order to prevent the expansion-contraction unit 150 from falling to the ground. The reception member 165 is arranged under the expansion-contraction unit 150 in the state where the vehicle step device 101 is attached to the vehicle body 102 or the base 103. The reception member 165 is fixed to the base 103 via a hanging member.

The step 105 operates by the drive unit 106 as follows.

In a state where the step 105 is arranged at the retracted position, the arm 104 is arranged in such a way as to be along the front-rear direction DY. At this time, the movement portion 152 of the expansion-contraction unit 150 is arranged at a position separated from the body portion 151 by a predetermined distance (refer to FIG. 23). When driving of the motor 153 causes the movement portion 152 to move in such a way as to approach the body portion 151, the extension portion 130 of the second arm 122 is pulled toward the first base 111 by the expansion-contraction unit 150. Interlocking with the rotation of the second arm 122, the first arm 121 and the third arm 123 move, and the step 105 moves toward the deployed position (refer to FIG. 22).

Effects of the present embodiment will be described.

The second base 112 supports the second arm 122 and the third arm 123. The second intermediate portion 112C included in the second base 112 and supporting the base portion 125 of the second arm 122 is provided between the third fastened portion 112A and the fourth fastened portion 112B in the width direction DX. In the second base 112, a fastened portion is omitted near the rear portion 112E that supports the base portion 125 of the third arm 123. In the second base 112, the contact portion 115 is provided at the extension association part 103A associated with the imaginary extension portion 123X of the third arm 123. The contact portion 115 is formed in such a way as to come into contact against the lower surface of the vehicle body 102. The contact portion 115 is pressed against the vehicle body 102 when a load is applied to the distal end portion of the third arm 123 in a case where the third arm 123 is arranged in such a way as to be along the width direction DX. Specifically, in a case where the step 105 is arranged at the deployed position, when a force is applied to the vicinity of the third arm 123, the contact portion 115 is pressed against the lower surface of the vehicle body 102. In such a manner, a part of a force applied to the step 105 is transmitted to the vehicle body 102 via the contact portion 115, and thus, a force applied to the shaft member 110 that supports the third arm 123 can be reduced. The contact portion 115 is not fixed to the vehicle body 102 by a screw, a rivet, or the like. Thus, the number of process steps of attaching work at the time of attaching the vehicle step device 101 to the vehicle body 102 can be reduced as compared with a case where the contact portion 115 is fastened by a screw, a rivet, or the like.

The vehicle step device 101 according to the present embodiment achieves the following advantageous effects.

(1) In the vehicle step device 101, the second base 112 includes the third fastened portion 112A and the fourth fastened portion 112B that are fastened to the vehicle body 102, the contact portion 115 that comes into contact against the lower surface of the vehicle body 102, and the shaft support portion 112Y that supports the shaft member 110 of the third arm 123. The contact portion 115 is located closer to the center of the vehicle body than the shaft support portion 112Y is. The contact portion 115 may be provided at the shaft support portion.

According to this configuration, the contact portion 115 is not fastened to the vehicle body 102, and thus, the number of process steps of attaching the vehicle step device 101 can be reduced as compared with a vehicle step device having a structure in which the contact portion 115 is fastened.

(2) In the vehicle step device 101, the second base 112 includes the third fastened portion 112A that is fastened to the vehicle body 102, and the contact portion 115 that comes into contact against the lower surface of the vehicle body 102. The contact portion 115 is provided at the extension association part 103A when the third arm 123 is arranged at the deployed position in the attached state of the vehicle step device 101. The contact portion 115 is arranged closer to the center of the vehicle body in the width direction DX along the width direction DXS of the vehicle body 102 than the third fastened portion 112A is, and is provided at least on a front side or a rear side in the second base 112. The extension association part 103A is a portion where the second base 112 overlaps with the imaginary extension portion 123X of the direction opposite to the extending direction of the arm portion 126 with respect to the base portion 125 of the arm 104.

According to this configuration, the second base 112 includes the third fastened portion 112A and the contact portion 115. Since the contact portion 115 is not fastened to the vehicle body 102, the number of process steps of attaching the vehicle step device 101 can be reduced as compared with the vehicle step device 101 having a structure in which the contact portion 115 is fastened. Since a structure for fastening the contact portion 115 to the vehicle body 102 is unnecessary, the second base 112 can be particularly made compact in the width direction DX of the vehicle body 102.

(3) The contact portion 115 is provided at the part that is the extension association part 103A and that is the screw extension portion 103B in a direction along the line of the screws of the fourth fastened portion 112B in the second base 112. In a case where the contact portion 115 is provided in such a way as to be separated from the fourth fastened portion 112B, there is a possibility that the contact portion 115 vibrates at the time of traveling of the vehicle, and the contact portion 115 rubs against the vehicle body 102. In this regard, according to the present embodiment, the contact portion 115 is provided near the fourth fastened portion 112B, and thus, vibration of the contact portion 115 is suppressed.

(4) The vehicle step device 101 may include the cushioning member 116. The cushioning member 116 is provided between the contact portion 115 and the contacted part 102A that is included in the vehicle body 102 and against which the contact portion 115 comes into contact. According to this configuration, the contact portion 115 does not come into direct contact with the vehicle body 102, and thus, the contact portion 115 does not rub against the vehicle body 102. Thereby, scratches on the vehicle body 102 caused by the contact portion 115 rubbing against the vehicle body 102 can be suppressed from being formed on the vehicle body 102.

(5) The vehicle step device 101 further includes the support member 109 that supports the arm 104, and the shaft member 110 that is attached to the support member 109. The support member 109 is attached to the base 103. The shaft member 110 includes the shaft body portion 110A that is attached to the support member 109 through the penetration hole 125A of the arm 104, and the head portion 110B that is provided at the end of the shaft body portion 110A. The base portion 125 of the arm 104 is sandwiched and held by the head portion 110B and the support member 109. According to this configuration, a strength of the support structure of the part that supports the arm 104 can be improved as compared with a case where the support member 109 is not provided. Since the support member 109 can secure rigidity of the structure including the base 103 and the support member 109, a freedom degree in the base structure is enhanced, and the base 103 is allowed to be compact.

(6) The vehicle step device 101 includes the arm 104 and the step 105 that is attached to the arm 104. The arm 104 is rotatably attached to the vehicle body structure 102X by the support member 109 and the shaft member 110. The support member 109 is provided directly or indirectly at the vehicle body 102. The shaft member 110 includes the shaft body portion 110A that is attached to the support member 109 through the penetration hole 125A of the arm 104, and the head portion 110B provided at the end of the shaft body portion 110A. The head portion 110B and the support member 109 sandwich and holds the base portion 125 of the arm 104. According to this configuration, the arm 104 can be easily attached to the support member 109.

(7) The arm 104 is rotatably attached to the vehicle body structure 102X. The vehicle body structure 102X may include the vehicle body 102 and the support member 109. According to this configuration, the arm 104 can be attached to the vehicle body 102 via the support member 109.

(8) The arm 104 is rotatably attached to the vehicle body structure 102X. The vehicle body structure 102X may include the vehicle body 102, the base 103, and the support member 109. According to this configuration, the arm 104 can be attached to the vehicle body 102 via the base 103 and the support member 109.

(9) In the attached state of the vehicle step device 101, both end portions of the support member 109 in the width direction DX are more firmly attached to the vehicle body 102 or the base 103 fixed to the vehicle body 102 than both end portions of the support member 109 in the direction intersecting with the width direction DX are.

According to this configuration, in the support member 109, a strength against a load in a rotational direction around a line along the front-rear direction DY can be improved. For example, detachment of the support member 109 from the vehicle body 102 is suppressed against an increase in a load in the rotational direction around the line along the front-rear direction DY.

(10) In the attached state of the vehicle step device 101, the first width DW1 of the support member 109 along the width direction DX is larger than the second width DW2 of the support member 109 along the direction perpendicular to the width direction DX.

According to this configuration, in the support member 109, a strength against a load in a rotational direction around a line along the front-rear direction DY can be improved. For example, detachment of the support member 109 from the vehicle body 102 is suppressed against an increase in a load in the rotational direction around the line along the front-rear direction DY.

Other Modified Examples

The third embodiment is not limited to the above-described configuration example. The third embodiment can be modified as in the following. In the following modified examples, constituents that are not substantially modified from those in the third embodiment are described while being denoted by the same reference signs of the constituents in the third embodiment.

Figure 24:
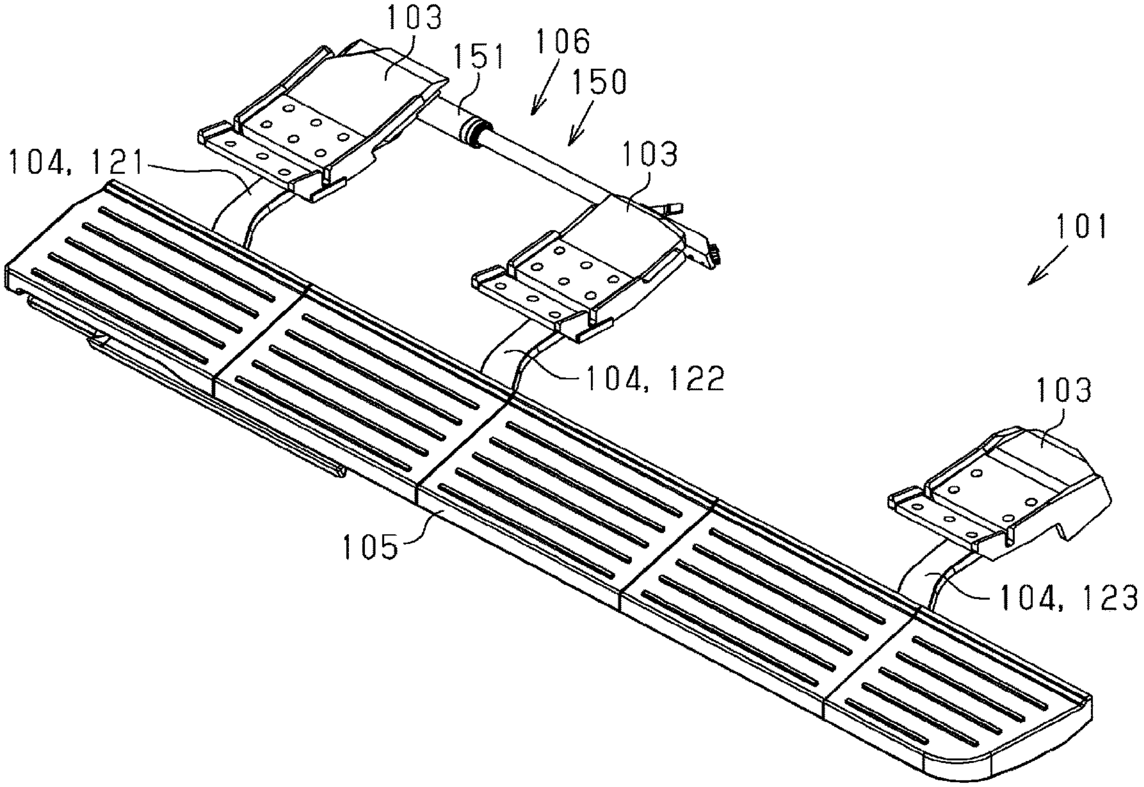
FIG. 24 is a perspective view of a modified example of the vehicle step device.
Figure 25:
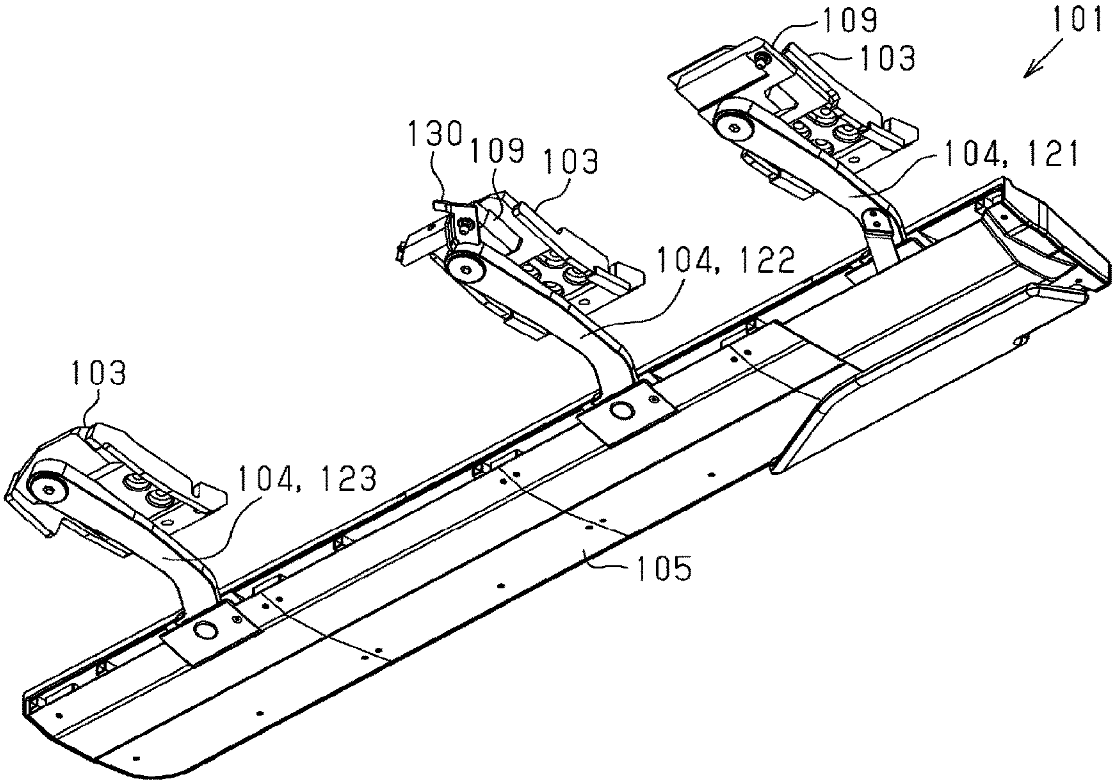
FIG. 25 is a perspective view of the vehicle step device of FIG. 24 when viewed from a lower side.

(1) As illustrated in FIG. 24 and FIG. 25, the base 103 may be provided for each of the arms 104. The bases 103 are individually fastened to the vehicle body 102. In this example, the body portion 151 of the expansion-contraction unit 150 is attached to the base 103 that supports the first arm 121. The movement portion 152 of the expansion-contraction unit 150 is attached to the extension portion 130 of the second arm 122.

(2) As illustrated in FIG. 25, the support member 109 may be provided in association with some of the arms 104 among a plurality of the arms 104. In the example illustrated in FIG. 25, the support member 109 is provided for each of the first arm 121 and the second arm 122. The third arm 123 is attached to the base 103 without being attached via the support member 109. FIG. 25 omits an illustration of the expansion-contraction unit 150.

(3) Other examples of the expansion-contraction unit 150 include a hydraulic actuator and a pneumatic actuator. The drive unit 106 may have a structure different from that of the expansion-contraction unit 150. The drive unit 106 may rotate the arm 104 by a gear.

(4) In the third embodiment, the second fastened portion 111B of the first base 111 may be omitted. In this case, instead of the second fastened portion 111B, the contact portion 115 is provided at the same place as that of the second fastened portion 111B. The fourth fastened portion 112B of the second base 112 may be omitted. In this case, instead of the fourth fastened portion 112B, the contact portion 115 is provided at the same place as that of the fourth fastened portion 112B. Thereby, the fastened portions included in the base 103 and fastened to the vehicle body 102 are only the first fastened portion 111A and the third fastened portion 112A that are arranged on an outer side in the vehicle body 102 in the width direction DX, and an inner part of the vehicle body 102 in the width direction DX is not fastened. Thus, a freedom degree in the vehicle body structure that is an attaching target of the vehicle step device 101 increases, and the vehicle step device 101 can be mounted on each of vehicles of various types. Since the vehicle step device 101 itself does not have a fastened structure at the inner part in the width direction DX, the vehicle step device 101 is allowed to be compact.

(5) The technique according to the third embodiment is also applied to the vehicle step devices 10 described in the first embodiment and the second embodiment. Specifically, the technique concerning the contact portion 115 in the third embodiment is disclosed in the first embodiment. The following describes the technique concerning a contact portion 23X in the first embodiment.

The base 11 includes a fastened portion (the fixed portion 21) that is fastened to the vehicle body 1, the contact portion 23X that comes into contact against the lower surface of the vehicle body 1, and the shaft support portion 22X. Here, the lower surface of the vehicle body 1 includes a lower surface of the protection member 15.

The shaft support portion 22X is located closer to the center of the vehicle body than the fastened portion (fixed portion 21) is, and supports the shaft member (first shaft 31) of the arm 12. The contact portion 23X is provided at the shaft support portion 22X. Alternatively, the contact portion 23X may be located closer to the center of the vehicle body than the shaft support portion 22X is.

In the first embodiment, the contact portion 23X is provided on an upper surface of a flange portion 23Z. The flange portion 23Z extends upward from each of both ends of the arm support portion 22 in the front-rear direction DY. In the first embodiment, the flange portion 23Z is formed as a part of the coupling portion 23. The contact portion 23X comes into contact against the protection member 15. The lower surface of the protection member 15 structurally constitutes the lower surface of the vehicle body 1. Thereby, the following effects are achieved.

The contact portion 23X comes into contact against the lower surface of the vehicle body 1. The contact portion 23X is pressed against the vehicle body 1 when a load is applied to the distal end portion of the arm 12 in a case where the arm 12 is arranged along the width direction DX. Specifically, in a case where the step 13 is arranged at the deployed position, when a force is applied to the vicinity of the arm 12, the contact portion 23X is pressed against the lower surface (i.e., the lower surface of the protection member 15) of the vehicle body 1. In such a manner, a part of a force applied to the step 13 is transmitted to the vehicle body 1 via the contact portion 23X, and thereby, a force applied to the shaft member (first shaft 31) that supports the arm 12 can be reduced. The contact portion 23X is not fixed to the vehicle body 1 by a screws, a rivet, or the like. Thus, the number of process steps of attaching work at the time of attaching the vehicle step device 10 to the vehicle body 1 can be reduced as compared with a case where the contact portion 23X is fastened by a screw, a rivet, or the like.

The following describes advantageous effects of the contact portion 23X in the first embodiment. The base 11 includes the fastened portion (fixed portion 21) that is fastened to the vehicle body 1, the contact portion 23X that comes into contact against the lower surface of the vehicle body 1, and the shaft support portion 22X. The contact portion 23X is provided at the shaft support portion 22X. Alternatively, the contact portion 23X may be located closer to the center of the vehicle body than the shaft support portion 22X is.

As described above, the base 11 includes the fastened portion (fixed portion 21), the contact portion 23X, and the shaft support portion 22X. Since the contact portion 23X is not fastened to the vehicle body 1, the number of process steps of attaching the vehicle step device 10 can be reduced as compared with a vehicle step device having a structure in which the contact portion 23X is fastened.

In the first embodiment, the shaft support portion 22X is located closer to the center of the vehicle body than the fastened portion (fixed portion 21) is. The contact portion 23X is located at the shaft support portion 22X. According to this configuration, a width-direction dimension of the vehicle step device 10 can be shortened in the vehicle step device 10 in which the shaft support portion 22X is closer to the center of the vehicle body than the fastened portion (fixed portion 21) is.

In the first embodiment, the shaft support portion 22X is provided with the flange portion 23Z that extends upward. According to this configuration, the contact portion 23X can be provided at the flange portion 23Z. In the first embodiment, the contact portion 23X is provided on the upper surface of the flange portion 23Z. Thereby, the shaft support portion 22X can be suppressed from coming into contact with the protection member 15.

REFERENCE SIGNS LIST

DX . . . width direction, DXA . . . width-direction inner side, 1 . . . vehicle body, 2 . . . frame member, 10 . . . vehicle step device, 11 . . . base, 11A . . . inner end portion, 11B . . . inner end, 11C . . . outer end portion, 12 . . . arm, 13 . . . step, 15 . . . protection member, 15A . . . upper end, 15B . . . lower end, 37 . . . outer inclination surface, 38 . . . inner inclination surface, 39 . . . flat portion, 61 . . . inclination portion, 62 . . . flat portion, 63 . . . boundary, 101 . . . vehicle step device, 102 . . . vehicle body, 102A . . . contact portion, 102X . . . vehicle body structure, 103 . . . base, 103A . . . extension association part, 103B . . . screw extension portion, 104 . . . arm, 105 . . . step, 109 . . . support member, 110 . . . shaft member, 110A . . . shaft body portion, 110B . . . head portion, 115 . . . contact portion, 116 . . . cushioning member, 123X . . . imaginary extension portion, 125 . . . base portion, 125A . . . penetration hole, 126 . . . arm portion, 128A . . . penetration hole

The invention claimed is:

1. A vehicle step device to be provided at a vehicle body, the vehicle step device comprising:
- a base attached to the vehicle body;
- an arm attached to the base; and
- a step attached to the arm, wherein
- the arm includes a base portion and an arm portion extending from the base portion,
- the base includes a fastened portion being fastened to the vehicle body, a contact portion coming into contact against a lower surface of the vehicle body, and a shaft support portion supporting a shaft member of the arm,
- the contact portion is located on the shaft support portion, or is located closer to a center of the vehicle body in a direction along a width direction of the vehicle body than the shaft support portion, and
- in an attached state where the vehicle step device is attached to the vehicle body, when the arm is arranged at a deployed position, the contact portion is provided at an extension association part where the base overlaps with an imaginary extension portion of a direction opposite to an extending direction of the arm portion with respect to the base portion, and the contact portion is arranged closer to the center of the vehicle body in the direction along the width direction of the vehicle body than the fastened portion, and is provided at least on a front side or on a rear side of the base.

2. The vehicle step device according to claim 1, wherein
- the base includes the fastened portion being fastened to the vehicle body by screws arranged in a line, and
- the extension association part intersects a line in a direction along the line of the screws.

3. The vehicle step device according to claim 1, further comprising
- a cushioning member, wherein
- the cushioning member is provided between the contact portion and a contacted part against which the contact portion comes into contact in the vehicle body.

4. The vehicle step device according to claim 1, further comprising: a support member supporting the arm; and a shaft member being attached to the support member, wherein
- the base portion of the arm includes a penetration hole through which the shaft member is inserted,
- the support member is attached to the base,
- the shaft member includes a shaft body portion being attached to the support member through the penetration hole of the arm, and a head portion provided at an end of the shaft body portion, and
- the base portion of the arm is sandwiched and held by the head portion and the support member.

* * * * *